US012609229B2

(12) United States Patent
Kazuta et al.

(10) Patent No.: US 12,609,229 B2
(45) Date of Patent: Apr. 21, 2026

(54) MULTILAYER INDUCTOR

(71) Applicant: TDK Corporation, Tokyo (JP)

(72) Inventors: Youichi Kazuta, Tokyo (JP); Junichiro Urabe, Tokyo (JP); Toshinori Matsuura, Tokyo (JP); Noriaki Hamachi, Tokyo (JP); Yuichi Takubo, Tokyo (JP); Yuto Shiga, Tokyo (JP); Kazuya Tobita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 782 days.

(21) Appl. No.: 17/964,280

(22) Filed: Oct. 12, 2022

(65) Prior Publication Data

US 2023/0119231 A1 Apr. 20, 2023

(30) Foreign Application Priority Data

Oct. 14, 2021 (JP) ................................ 2021-168734

(51) Int. Cl.
*H01F 17/00* (2006.01)
*H01F 17/02* (2006.01)
*H01F 27/29* (2006.01)

(52) U.S. Cl.
CPC ......... *H01F 17/0013* (2013.01); *H01F 17/02* (2013.01); *H01F 27/292* (2013.01); *H01F 2017/0073* (2013.01)

(58) Field of Classification Search
CPC .... H01F 17/0013; H01F 17/02; H01F 27/292; H01F 2017/0073
See application file for complete search history.

(56) References Cited

U.S. PATENT DOCUMENTS

| | | | | |
|---|---|---|---|---|
| 10,847,307 | B1 * | 11/2020 | Tajima | H01F 41/043 |
| 2010/0219925 | A1 * | 9/2010 | Yamamoto | H01F 41/041 29/606 |
| 2014/0306792 | A1 * | 10/2014 | Yoneda | H01F 17/0013 336/200 |
| 2016/0233027 | A1 * | 8/2016 | Iijima | H01G 4/232 |
| 2016/0276104 | A1 * | 9/2016 | Nishisaka | H01G 4/2325 |
| 2019/0006084 | A1 * | 1/2019 | Shiga | H01F 5/04 |

(Continued)

FOREIGN PATENT DOCUMENTS

| | | | |
|---|---|---|---|
| JP | 2005-209881 | A | 8/2005 |
| JP | 2020-61409 | A | 4/2020 |
| JP | 2021-027228 | A | 2/2021 |

*Primary Examiner* — Malcolm Barnes
(74) *Attorney, Agent, or Firm* — Oliff PLC

(57) ABSTRACT

The element body includes a main surface, and a side surface located on imaginary planes orthogonal to the main surface. The external electrode includes first, second and third electrode portions. The first electrode portion is exposed at the main surface. The second electrode portion is continuous with the first electrode portion and exposed at the main surface. The second electrode portion is located to extend from the first electrode portion to the imaginary planes when viewed in a direction orthogonal to the main surface. The third electrode portion is continuous with the first electrode portion and is separated from the second electrode portion in the direction orthogonal to the main surface. The third electrode portion includes outer edges coinciding with the imaginary planes when viewed in the direction orthogonal to the main surface. The element body includes a part between the second electrode portion and the third electrode portion.

7 Claims, 11 Drawing Sheets

(56) References Cited

U.S. PATENT DOCUMENTS

| | | | | |
|---|---|---|---|---|
| 2019/0051450 | A1* | 2/2019 | Shimoda | H01F 27/292 |
| 2019/0333686 | A1* | 10/2019 | Kazuta | H01F 27/2804 |
| 2020/0111603 | A1 | 4/2020 | Sato et al. | |
| 2021/0043364 | A1* | 2/2021 | Nakashima | H01F 17/0013 |

* cited by examiner

MULTILAYER INDUCTOR

BACKGROUND OF THE INVENTION

Field of the Invention

The present invention relates to a multilayer inductor.

Description of Related Art

Known multilayer inductors include an element body including a mounting surface, a coil disposed in the element body, and an external electrode electrically connected to the coil and disposed on the element body (for example, refer to Japanese Unexamined Patent Publication No. 2020-61409 and Japanese Unexamined Patent Publication No. 2005-209881). The element body includes a part between portions of the external electrode.

SUMMARY OF THE INVENTION

An object of an aspect of the present invention is to provide a multilayer inductor that further prevents peeling-off of an external electrode from an element body.

The present inventors conducted thorough research on the multilayer inductor that further prevents peeling-off of the external electrode from the element body. As a result, the present inventors newly obtained the following finding, and have accomplished the present invention.

In a case where the external electrode includes the following configuration, peeling-off of the external electrode from the element body is further suppressed. The element body includes a main surface arranged to constitute a mounting surface, and a side surface adjacent to the main surface and located on imaginary planes orthogonal to the main surface. The external electrode includes an electrode portion exposed at the main surface, and an electrode portion located within the element body so that the element body includes a part between the electrode portion located within the element body and the electrode portion exposed at the main surface. The electrode portion located in the element body includes outer edges coinciding with the imaginary planes when viewed in a direction orthogonal to the main surface. Japanese Unexamined Patent Publication No. 2020-61409 and Japanese Unexamined Patent Publication No. 2005-209881 do not disclose a multilayer inductor including an external electrode including the above configuration.

A multilayer inductor according to one aspect includes an element body, a coil disposed in the element body, and an external electrode disposed on the element body and electrically connected to the coil. The element body includes a main surface arranged to constitute a mounting surface, and a side surface adjacent to the main surface and located on imaginary planes orthogonal to the main surface. The external electrode includes a first electrode portion, a second electrode portion, and a third electrode portion. The first electrode portion is exposed at the main surface. The second electrode portion is continuous with the first electrode portion and exposed at the main surface. The second electrode portion is located to extend from the first electrode portion to the imaginary planes when viewed in the direction orthogonal to the main surface. The third electrode portion is continuous with the first electrode portion and is separated from the second electrode portion in the direction orthogonal to the main surface. The third electrode portion includes the outer edges coinciding with the imaginary planes when viewed in the direction orthogonal to the main surface. The element body includes a part between the second electrode portion and the third electrode portion.

In the one aspect, the external electrode includes the second electrode portion and the third electrode portion that is continuous with the first electrode portion. The third electrode portion includes the outer edges coinciding with the imaginary planes. The side surface of the element body adjacent to the mounting surface is located on the imaginary plane. The third electrode portion includes the outer edges coinciding with the imaginary planes. Therefore, the one aspect further prevents the peeling-off of the external electrode from the element body.

In the one aspect, the external electrode may include an electrode layer formed on the third electrode portion and exposed at the side surface. A first width in the direction orthogonal to the main surface of the electrode layer may be larger than a second width in the direction orthogonal to the main surface of the third electrode portion at the outer edges of the third electrode portion.

In the configuration in which the first width is larger than the second width, the electrode layer exposed at the side surface can cause an anchor effect. Therefore, this configuration certainly realizes further prevention of peeling-off of the external electrode from the element body.

In the one aspect, the second electrode portion may include the outer edges coinciding with the imaginary planes when viewed in the direction orthogonal to the main surface, and the electrode layer may be formed on the second electrode portion at an outer edge of the second electrode portion.

In the configuration in which the electrode layer is formed on the second electrode portion at the outer edge of the second electrode portion, the anchor effect is further improved. Therefore, this configuration more certainly realizes further prevention of peeling-off of the external electrode from the element body.

In the one aspect, the second electrode portion may include a first portion that is continuous with the first electrode portion and exposed at the main surface, and a second portion located closer to the imaginary plane than the first portion, and the second portion may be located in the element body.

In the configuration in which the second portion is located in the element body, a contact area between the second electrode portion and the element body can be increased. Therefore, this configuration more certainly realizes further prevention of peeling-off of the external electrode from the element body.

In the one aspect, the side surface may include a first side surface, a second side surface, and a third side surface. The first side surface is located on a first imaginary plane orthogonal to the main surface. The second side surface opposes the first side surface and is located on a second imaginary plane. The second imaginary plane is orthogonal to the main surface and opposes the first imaginary plane. The third side surface is adjacent to the first side surface and the second side surface and is located on a third imaginary plane. The third imaginary plane is orthogonal to the main surface, the first imaginary plane, and the second imaginary plane. The second electrode portion may include a first side portion including an outer edge coinciding with the first imaginary plane when viewed in the direction orthogonal to the main surface, a second side portion including an outer edge coinciding with the second imaginary plane when viewed in the direction orthogonal to the main surface, and a third side portion including an outer edge coinciding with the third imaginary plane when viewed in the direction orthogonal to the main surface. The third electrode portion may include a first side portion including an outer edge coinciding with the first imaginary plane when viewed in the direction orthogonal to the main surface, a second side portion including an outer edge coinciding with the second imaginary plane when viewed in the direction orthogonal to the main surface, and a third side portion including an outer edge coinciding with the third imaginary plane when viewed in the direction orthogonal to the main surface. The external electrode may include a fourth electrode portion and a fifth electrode portion. The fourth electrode portion is continuous with the first electrode portion and the first side portion and the second side portion of the second electrode portion, is exposed at the main surface, and is separated from the third side surface when viewed in the direction orthogonal to the main surface. The fifth electrode portion is continuous with the first electrode portion and is separated from the fourth electrode portion in the direction orthogonal to the main surface. The element body may include a part between the fourth electrode portion and the fifth electrode portion.

One configuration includes the second and third electrode portion each including the first, second, and third side portions described above, the external electrode including the fourth and fifth electrode portions described above, the element body including the part between the fourth electrode portion and the fifth electrode portion. This one configuration certainly realizes further prevention of peeling-off of the external electrode from the element body.

In the one aspect, the side surface may include a first side surface, a second side surface, and a third side surface. The first side surface is located on a first imaginary plane orthogonal to the main surface. The second side surface faces the first side surface and is located on a second imaginary plane. The second imaginary plane is orthogonal to the main surface and faces the first imaginary plane. The third side surface is adjacent to the first side surface and the second side surface and is located on a third imaginary plane. The third imaginary plane is orthogonal to the main surface, the first imaginary plane, and the second imaginary plane. The second electrode portion may include a first side portion including an outer edge coinciding with the first imaginary plane when viewed in the direction orthogonal to the main surface, a second side portion including an outer edge coinciding with the second imaginary plane when viewed in the direction orthogonal to the main surface, and a third side portion including an outer edge coinciding with the third imaginary plane when viewed in the direction orthogonal to the main surface. The third electrode portion may include a first side portion including an outer edge coinciding with the first imaginary plane when viewed in the direction orthogonal to the main surface, and a second side portion including an outer edge coinciding with the second imaginary plane when viewed in the direction orthogonal to the main surface. The external electrode may include a fourth electrode portion and a fifth electrode portion. The fourth electrode portion is continuous with the first electrode portion and the first side portion and the second side portion of the second electrode portion, is exposed at the main surface, and is separated from the third side surface when viewed in the direction orthogonal to the main surface. The fifth electrode portion is continuous with the first electrode portion and is separated from the fourth electrode portion in the direction orthogonal to the main surface. The element body may include a part between the fourth electrode portion and the fifth electrode portion.

Another configuration includes the second and third electrode portion each including the first, second, and third side portions described above, the external electrode including the fourth and fifth electrode portions described above, the element body including the part between the fourth electrode portion and the fifth electrode portion. This other configuration more certainly realizes further prevention of peeling-off of the external electrode from the element body.

The present invention will become more fully understood from the detailed description given hereinafter and the accompanying drawings which are given by way of illustration only, and thus are no to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
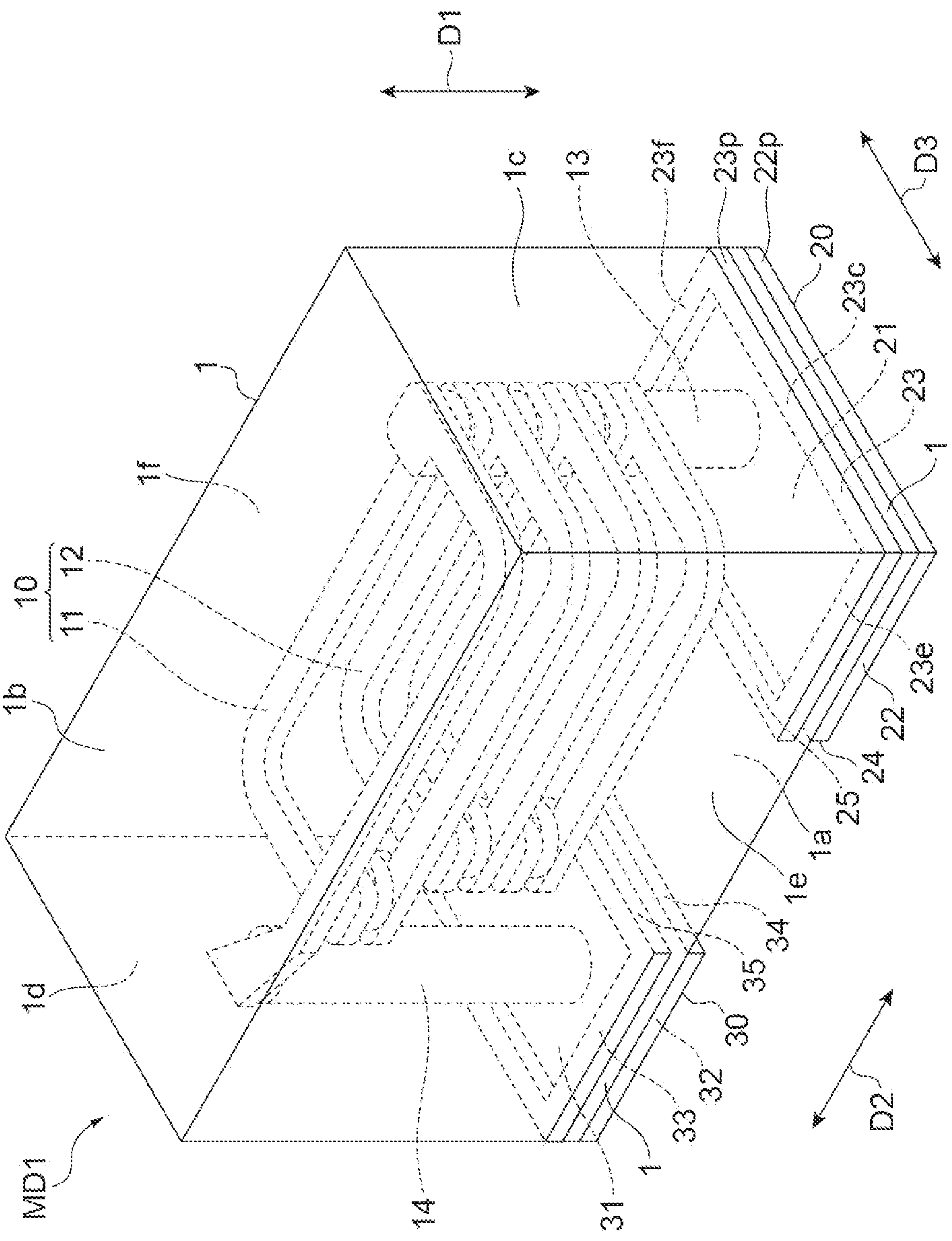
FIG. 1 is a perspective view illustrating a multilayer inductor according to an embodiment.

Hereinafter, embodiments of the present invention will be described in detail with reference to the accompanying drawings. In the following description, the same elements or elements having the same functions are denoted with the same reference numerals and overlapped explanation is omitted.

Figure 2:
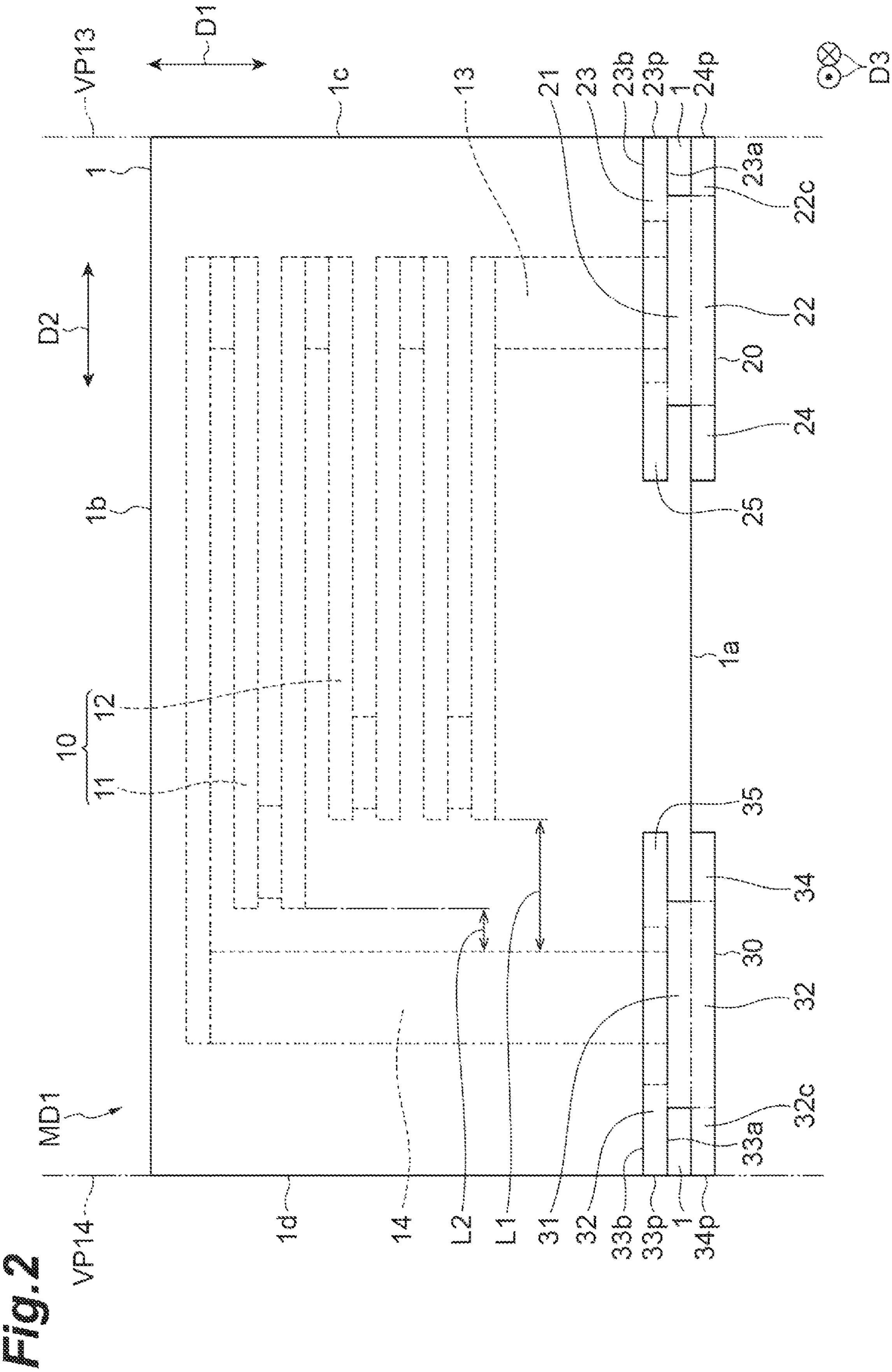
FIG. 2 is a side view illustrating the multilayer inductor according to the present embodiment.
Figure 3:
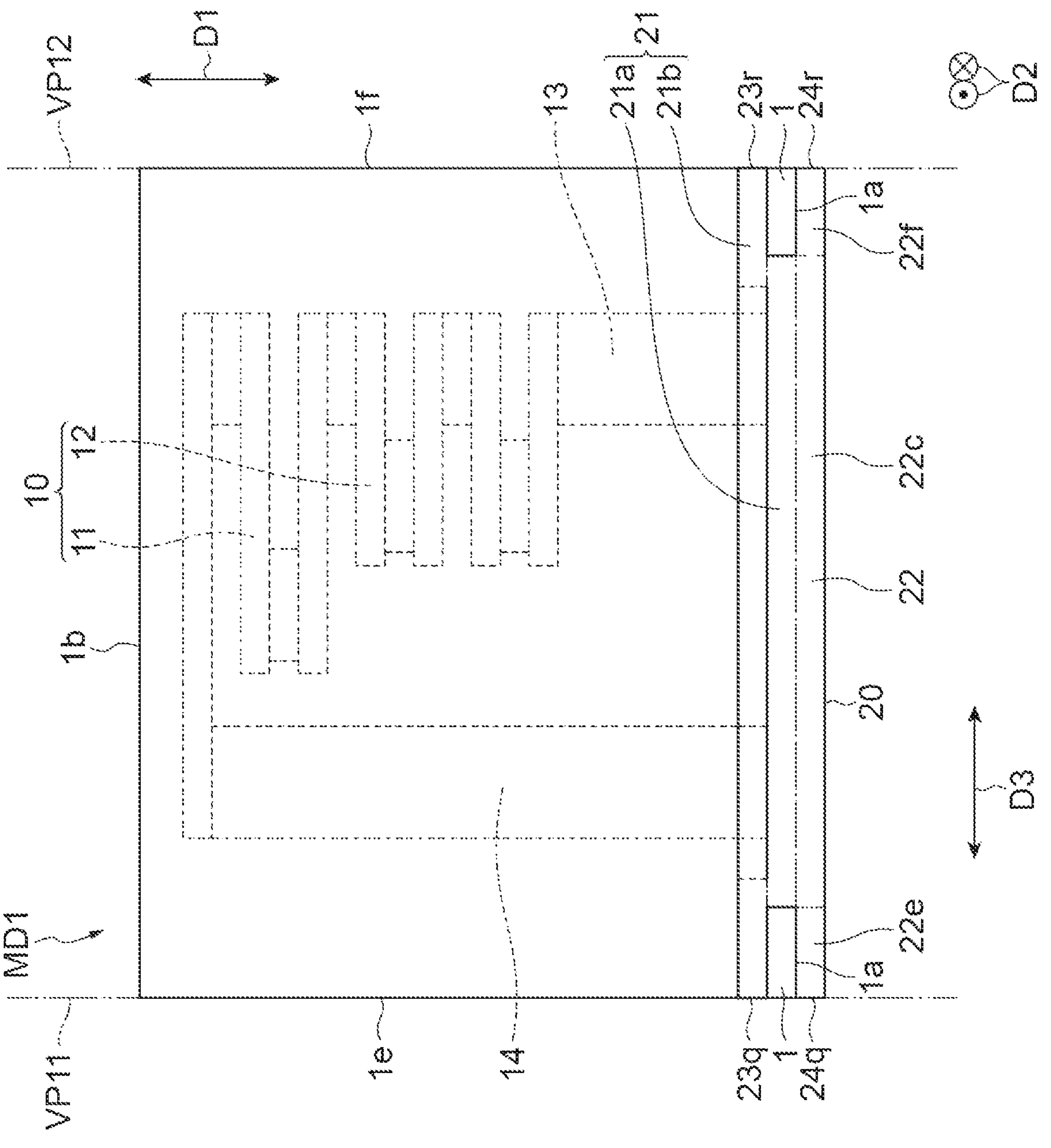
FIG. 3 is a side view illustrating the multilayer inductor according to the present embodiment.
Figure 4A:
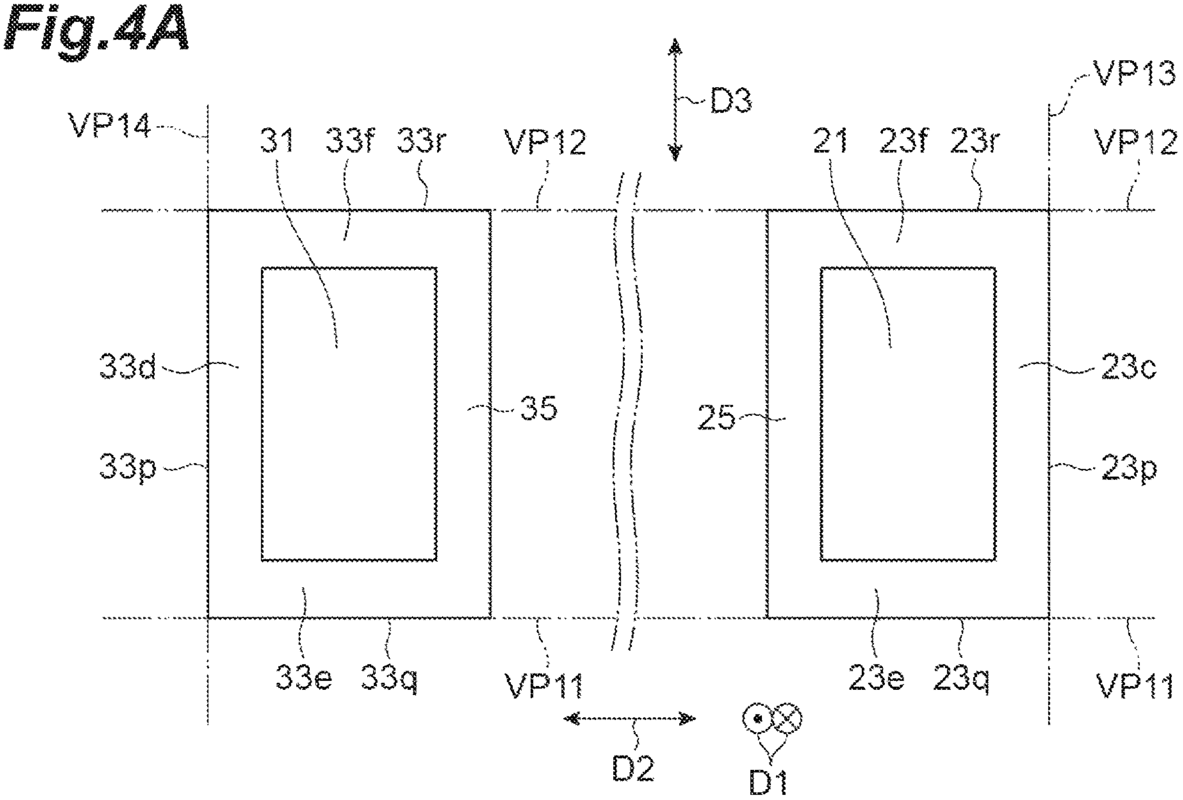
FIG. 4A is a plan view illustrating a first electrode portion, a third electrode portion, and a fifth electrode portion of each of external electrodes.

A configuration of a multilayer inductor MD1 will be described with reference to FIGS. 1 to 8. FIG. 1 is a perspective view illustrating a multilayer inductor according to an embodiment. FIG. 2 is a side view illustrating the multilayer inductor according to the present embodiment. FIG. 3 is a side view illustrating the multilayer inductor according to the present embodiment. FIG. 4A is a plan view illustrating a first electrode portion, a third electrode portion, and a fifth electrode portion of each of external electrodes.

Figure 4B:
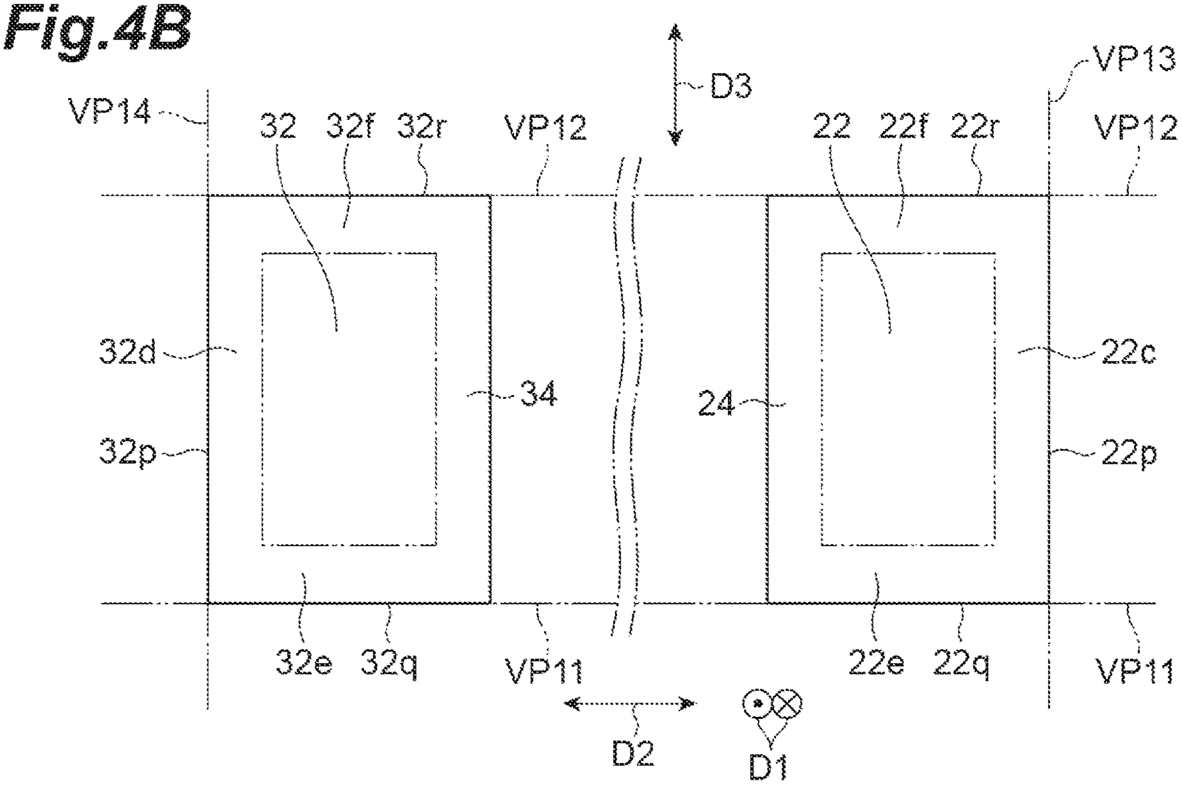
FIG. 4B is a plan view illustrating a second electrode portion and a fourth electrode portion of each of the external electrodes.
Figure 5:
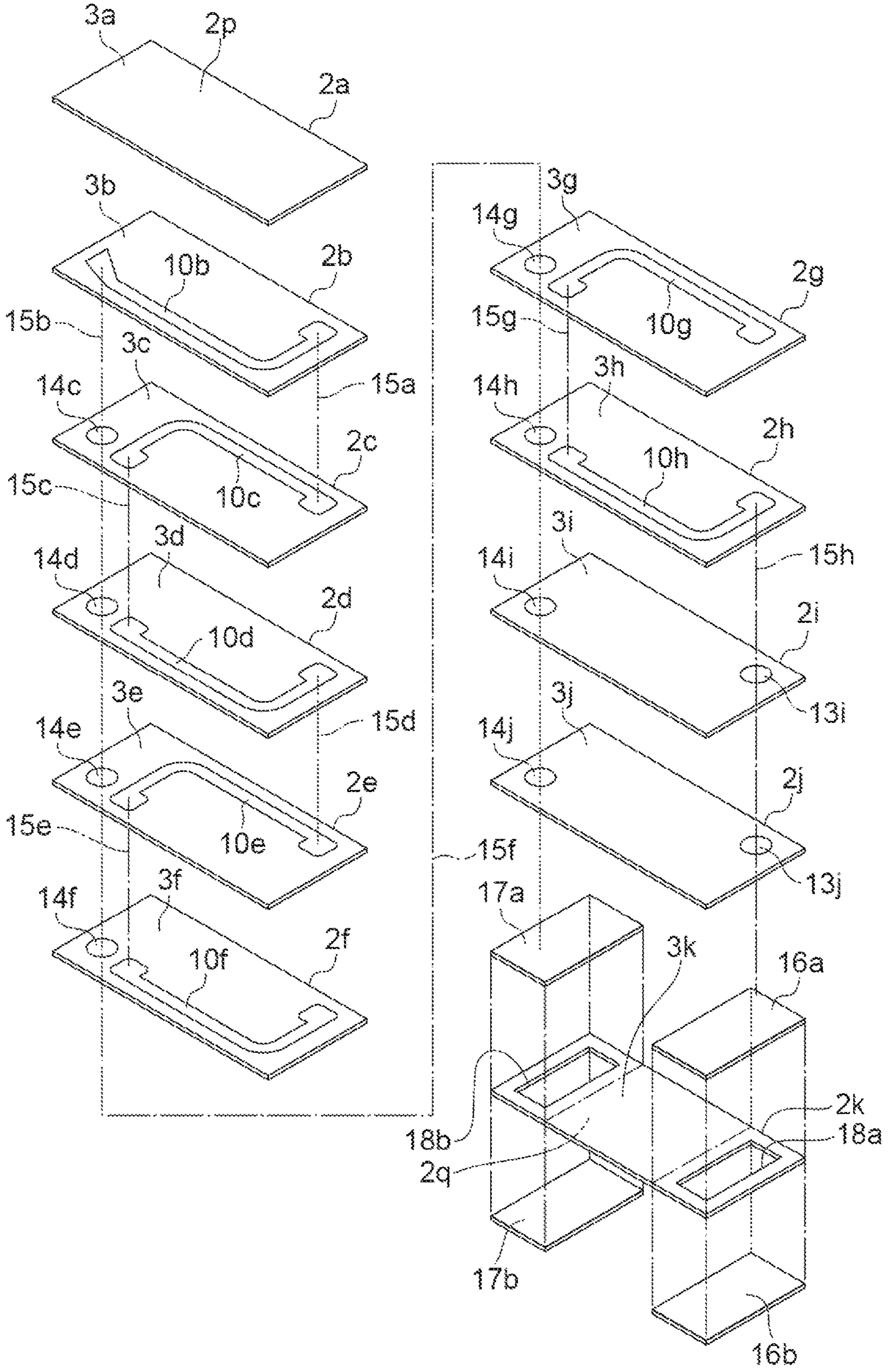
FIG. 5 is an exploded perspective view illustrating the multilayer inductor according to the present embodiment.
Figure 6:
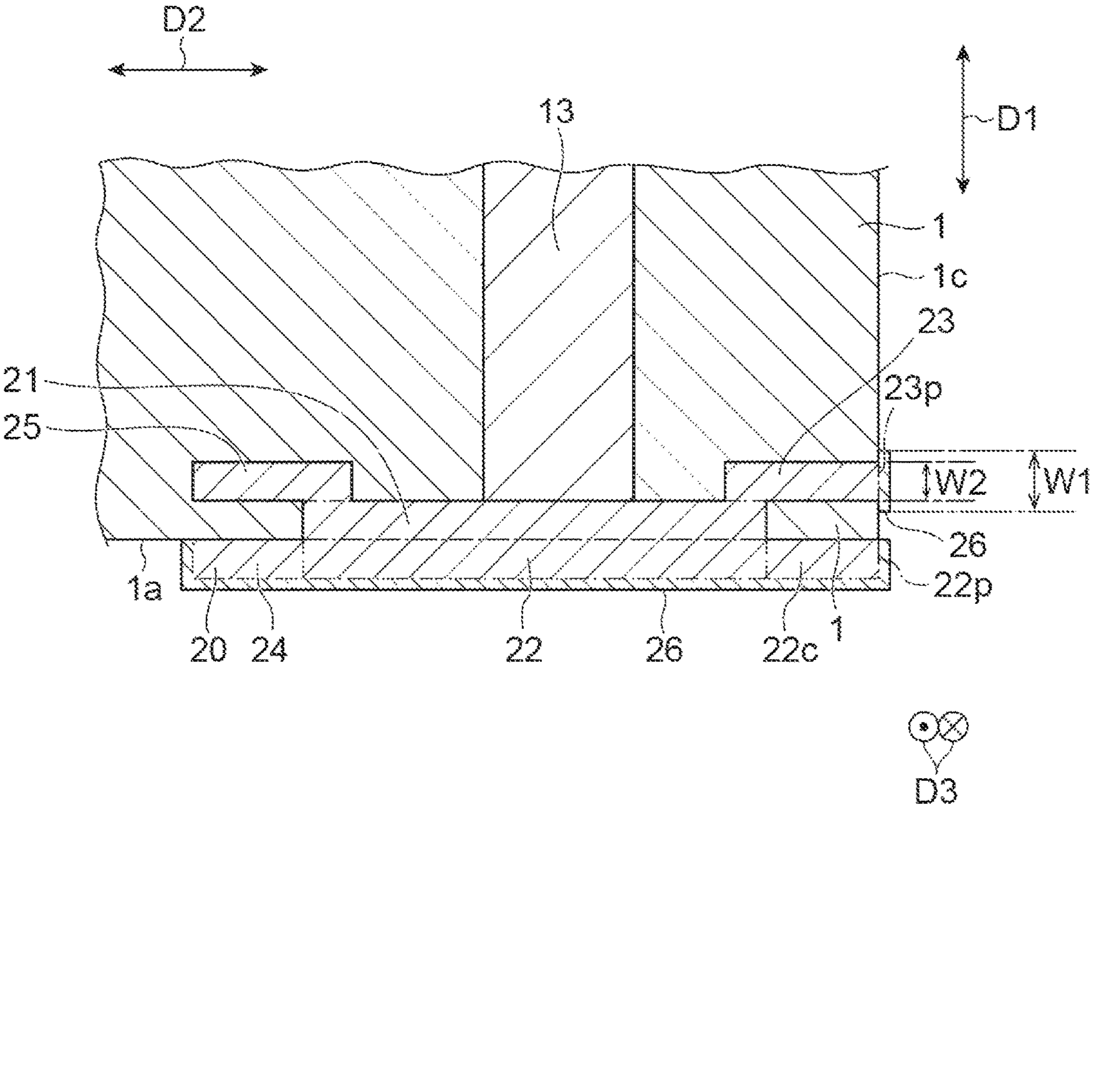
FIG. 6 is a cross-sectional view of the external electrode.
Figure 7:
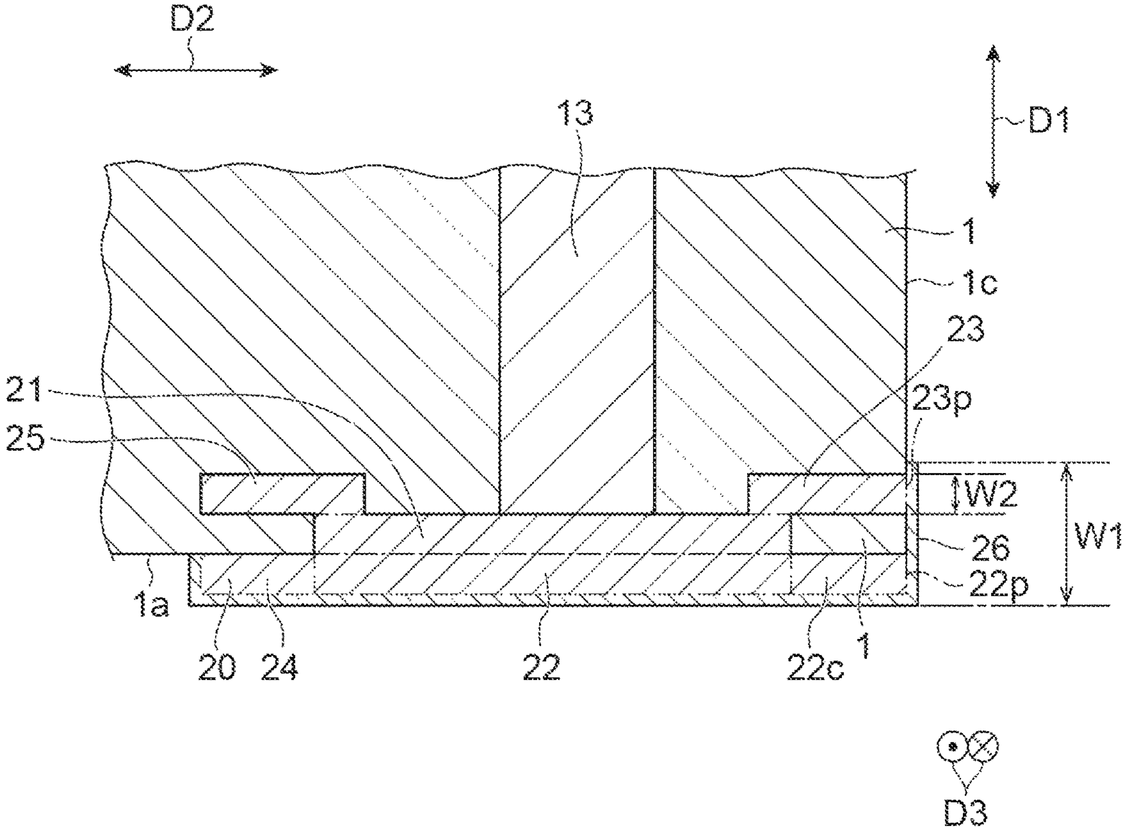
FIG. 7 is a cross-sectional view of the external electrode.
Figure 8:
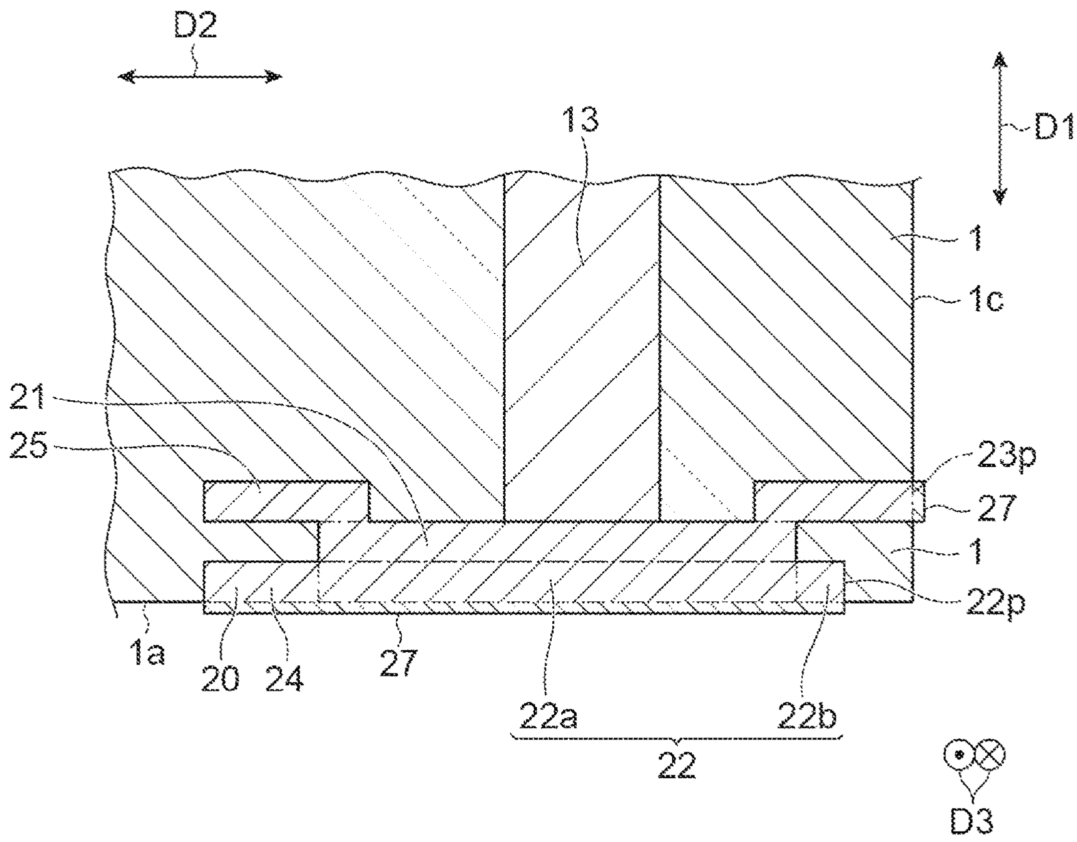
FIG. 8 is a cross-sectional view of the external electrode.

FIG. 4B is a plan view illustrating a second electrode portion and a fourth electrode portion of each of the external electrodes. FIG. 5 is an exploded perspective view illustrating the multilayer inductor according to the present embodiment. FIG. 6 is a cross-sectional view of the external electrode. FIG. 7 is a cross-sectional view of the external electrode. FIG. 8 is a cross-sectional view of the external electrode.

The multilayer inductor MD1 includes an element body 1, a coil 10, and a pair of external electrodes 20 and 30. The coil 10 is disposed in the element body 1. The external electrodes 20 and 30 are disposed on the element body 1 and are electrically connected to the coil 10.

The element body 1 has, for example, a rectangular parallelepiped shape. The element body 1 includes a pair of main surfaces 1*a* and 1*b* opposing each other, a pair of side surfaces 1*c* and 1*d* opposing each other, and a pair of side surfaces 1*e* and 1*f* opposing each other. The main surfaces 1*a* and 1*b* and the side surfaces 1*c*, 1*d*, 1*e*, and 1*f* constitute the outer surfaces of the element body 1. The main surfaces 1*a* and 1*b* extend in a direction intersecting a first direction D1. In the present embodiment, the main surface 1*a* extends in a direction orthogonal to the first direction D1. The main surface 1*a* is arranged to constitute a mounting surface. The main surface 1*a* opposes an electronic device in a case where the multilayer inductor MD1 is mounted on the electronic device. The electronic device includes, for example, a circuit board or a multilayer electronic component.

The main surfaces 1*a* and 1*b* oppose each other in the first direction D1. The main surfaces 1*a* and 1*b* define both ends of the element body 1 in the first direction D1. The side surfaces 1*c* and 1*d* are adjacent to the main surfaces 1*a* and 1*b* and extend in a second direction D2 intersecting the first direction D1. The side surfaces 1*c* and 1*d* oppose each other in the second direction D2. The side surfaces 1*c* and 1*d* define both ends of the element body 1 in the second direction D2. The side surfaces 1*e* and 1*f* are adjacent to the main surfaces 1*a* and 1*b* and extend in the second direction D2. The side surfaces 1*e* and 1*f* oppose each other in a third direction D3. The side surfaces 1*e* and 1*f* define both ends of the element body 1 in the third direction D3. In the present embodiment, the first direction D1, the second direction D2, and the third direction D3 are orthogonal to each other. The "rectangular parallelepiped shape" in the present description includes a rectangular parallelepiped shape in which corner portions and ridge portions are chamfered, or a rectangular parallelepiped shape in which corner portions and ridge portions are rounded.

The main surface 1*a* and the main surface 1*b* extend in the second direction D2 to couple the side surface 1*c* and the side surface 1*d*. The main surface 1*a* and the main surface 1*b* extend in the third direction D3 to couple the side surface 1*e* and the side surface 1*f*. The side surface 1*c* and the side surface 1*d* extend in the first direction D1 to couple the main surface 1*a* and the main surface 1*b*. The side surface 1*c* and the side surface 1*d* extend in the third direction D3 to couple the side surface 1*e* and the side surface 1*f*. The side surface 1*e* and the side surface 1*f* extend in the first direction D1 to couple the main surface 1*a* and the main surface 1*b*. The side surface 1*e* and the side surface 1*f* extend in the second direction D2 to couple the side surface 1*c* and the side surface 1*d*. The side surface 1*c* is adjacent to the side surface 1*e* and the side surface 1*f*. The side surface 1*d* is adjacent to the side surface 1*e* and the side surface 1*f*.

In the present embodiment, the side surfaces 1*c*, 1*d*, 1*e*, and 1*f* are each located on imaginary planes. The imaginary planes include, for example, an imaginary plane VP11, an imaginary plane VP12, an imaginary plane VP13, and an imaginary plane VP14. The side surface 1*e* is located on the imaginary plane VP11 orthogonal to the main surface 1*a*. The side surface 1*f* opposes the side surface 1*e* and is located on the imaginary plane VP12. The imaginary plane VP12 is orthogonal to the main surface 1*a* and opposes the imaginary plane VP11. The side surface 1*c* is adjacent to the side surface 1*e* and the side surface 1*f* and is located on the imaginary plane VP13 orthogonal to the main surface 1*a*, the imaginary plane VP11, and the imaginary plane VP12. The side surface 1*d* is adjacent to the side surface 1*e* and the side surface 1*f* and is located on the imaginary plane VP14 orthogonal to the main surface 1*a*, the imaginary plane VP11, and the imaginary plane VP12. For example, when the side surface 1*e* constitutes the first side surface, the side surface 1*f* constitutes the second side surface, and the side surface 1*c* constitutes the third side surface. For example, when the imaginary plane VP11 constitutes the first imaginary plane, the imaginary plane VP12 constitutes the second imaginary plane, the imaginary plane VP13 constitutes the third imaginary plane, and the imaginary plane VP14 constitutes a fourth imaginary plane.

The length of the element body 1 in the first direction D1 is, for example, approximately 0.2 mm. The length of the element body 1 in the second direction D2 is, for example, approximately 0.4 mm. The length of the element body 1 in the third direction D3 is, for example, approximately 0.2 mm. In the present embodiment, for example, the second direction D2 is the longitudinal direction of the element body 1.

The element body 1 is formed by laminating a plurality of layers 2*a* to 2*k*, for example. In the present embodiment, the laminating direction of the plurality of layers 2*a* to 2*k* is the first direction D1. The plurality of layers 2*a* to 2*k* are integrated to such an extent that boundaries between the layers 2*a* to 2*k* cannot be visually recognized in practice. The layers 2*a* to 2*k* include, for example, insulator layers 3*a* to 3*k*. The insulator layers 3*a* to 3*k* include, for example, a magnetic material. The magnetic material of the insulator layers 3*a* to 3*k* includes, for example, a Ni—Cu—Zn ferrite material, a Ni—Cu—Zn—Mg ferrite material, or a Ni—Cu ferrite material. The magnetic material of the insulator layers includes, for example, an Fe alloy. The insulator layers 3*a* to 3*k* include, for example, a nonmagnetic material. The nonmagnetic material included in the insulator layers 3*a* to 3*k* includes, for example, a glass ceramic material or a dielectric material.

The coil 10 is disposed in the element body 1. The coil 10 has, for example, a spiral shape. The coil 10 includes, for example, a plurality of coil conductor layers 10*b* to 10*h* and a plurality of through-hole conductors 15*a* to 15*h*. The plurality of coil conductor layers 10*b* to 10*h* are connected to each other by the through-hole conductors 15*a* to 15*h*. In the present embodiment, the axial direction of the coil 10 is the first direction D1. The coil conductor layers 10*b* to 10*h* are disposed to at least partially overlap each other when viewed in the first direction D1. The coil conductor layers 10*b* to 10*h* are separated from the main surfaces 1*a* and 1*b* and the side surfaces 1*c*, 1*d*, 1*e*, and 1*f*.

The coil 10 includes a first coil portion 11 and a second coil portion 12. The first coil portion 11 and the second coil portion 12 are connected to each other. In the present embodiment, the first coil portion 11 includes a plurality of coil conductor layers 10*b* to 10*d*. The second coil portion 12 includes a plurality of coil conductor layers 10*e* to 10*h*. The first coil portion 11 is disposed, for example, near the main surface 1*b*. The second coil portion 12 is disposed, for example, near the main surface 1*a*.

In the element body 1, a first connection conductor 13 and a second connection conductor 14 are disposed. The first connection conductor 13 electrically connects the coil 10 and the external electrode 20. The second connection conductor 14 electrically connects the coil 10 and the external electrode 30.

The first connection conductor 13 includes a through-hole conductor extending in the first direction D1. The first connection conductor 13 includes a plurality of first through-hole conductor layers 13*i* and 13*j*. An end of the first connection conductor 13 closer to the main surface 1*b* is connected to one end of the coil 10 closer to the main surface 1*b*. The first connection conductor 13 is disposed closer to the outer surface of the element body 1 than the coil 10 when viewed in the first direction D1. The first connection conductor 13 is disposed, for example, near a corner defined by the side surface 1*c* and the side surface 1*f*. An end of the first connection conductor 13 closer to the main surface 1*a* is connected to the external electrode 20.

The second connection conductor 14 is a through-hole conductor extending in the first direction D1, and includes a plurality of second through-hole conductor layers 14*c* to 14*j*. An end of the second connection conductor 14 closer to the main surface 1*b* is connected to one end of the coil 10 closer to the main surface 1*b*. The second connection conductor 14 is disposed closer to the corner defined by the outer surfaces of the element body 1 than the coil 10 when viewed in the first direction D1. The second connection conductor 14 is disposed, for example, near a corner defined by the side surface 1*d* and the side surface 1*e*. An end of the second connection conductor 14 closer to the main surface 1*a* is connected to the external electrode 30.

The first connection conductor 13 and the second connection conductor 14 include, for example, a cylindrical shape. The cylindrical cross section may have a perfect circular shape or an elliptical shape. The first connection conductor 13 and the second connection conductor 14 may have a triangular prism shape or a quadrangular prism shape.

The external electrodes 20 and 30 are disposed on the element body 1. The external electrode 20 is disposed, for example, near the side surface 1*c*. The external electrode 30 is disposed, for example, near the side surface 1*d*. The external electrode 20 and the external electrode 30 are, for example, separated from each other in the second direction D2. The external electrodes 20 and 30 have, for example, a rectangular shape when viewed in the first direction D1. The "rectangular shape" in the present description includes, for example, a shape in which each corner is chamfered or a shape in which each corner is rounded.

The external electrode 20 includes a first electrode portion 21 and a second electrode portion 22. The second electrode portion 22 is continuous with the first electrode portion 21 in the first direction D1. The first electrode portion 21 is closer to the main surface 1*b* than the second electrode portion 22. The first electrode portion 21 is exposed at the main surface 1*a*. The second electrode portion 22 is exposed at the main surface 1*a*. The second electrode portion 22 is located to extend from the first electrode portion 21 to the imaginary planes VP11, VP12, and VP13 when viewed in the first direction D1. The second electrode portion 22 includes an outer edge 22*p*. The outer edge 22*p* coincides with the imaginary plane VP13 when viewed in the first direction D1.

The second electrode portion 22 includes a first side portion 22*e*, a second side portion 22*f*, and a third side portion 22*c*. The first side portion 22*e* includes an outer edge 22*q* coinciding with the imaginary plane VP11 when viewed in the first direction D1. The second side portion 22*f* includes an outer edge 22*r* coinciding with the imaginary plane VP12 when viewed in the first direction D1. The third side portion 22*c* includes an outer edge 22*p* coinciding with the imaginary plane VP13 when viewed in the first direction D1. In the present description, "the outer edge coinciding with the imaginary plane" includes the case where the outer edge does not coincide with the imaginary plane unintentionally. For example, a configuration in which the outer edge does not coincide with the imaginary plane unintentionally due to a manufacturing error or tolerance is included in a configuration in which the outer edge coincides with the imaginary plane.

The external electrode 20 includes a third electrode portion 23. The third electrode portion 23 is continuous with the first electrode portion 21 and is separated from the second electrode portion 22 in the first direction D1. The third electrode portion 23 includes an outer edge 23*p*. The outer edge 23*p* coincides with the imaginary plane VP13 when viewed in the first direction D1. The third electrode portion 23 includes an upper edge 23*b* and a lower edge 23*a* opposing each other in the first direction D1. The upper edge 23*b* and the lower edge 23*a* define both end portions of the third electrode portion 23 in the first direction D1.

The third electrode portion 23 includes a first side portion 23*e*, a second side portion 23*f*, and a third side portion 23*c*. The first side portion 23*e* includes an outer edge 23*q* coinciding with the imaginary plane VP11 when viewed in the first direction D1. The second side portion 23*f* includes an outer edge 23*r* coinciding with the imaginary plane VP12 when viewed in the first direction D1. The third side portion 23*c* includes the outer edge 23*p* coinciding with the imaginary plane VP13 when viewed in the first direction D1. The outer edge 23*q* is exposed at the side surface 1*c*, for example. In this case, the third electrode portion 23 is buried in the element body 1 except for the outer edge 23*q*. The upper edge 23*b* and the lower edge 23*a* are also buried in the element body 1.

The external electrode 20 includes a fourth electrode portion 24 and a fifth electrode portion 25. The fourth electrode portion 24 is continuous with the first side portion 22*e* and the second side portion 22*f* of the second electrode portion 22. The fourth electrode portion 24 is exposed at the main surface 1*a*. The fourth electrode portion 24 is separated from the side surface 1*c* when viewed in the first direction D1. The fifth electrode portion 25 is continuous with the first electrode portion 21. The fifth electrode portion 25 is separated from the fourth electrode portion 24 in the first direction D1. The element body 1 includes a part between the fourth electrode portion 24 and the fifth electrode portion 25 in the first direction D1.

The external electrode 30 includes a first electrode portion 31 and a second electrode portion 32. The second electrode portion 32 is continuous with the first electrode portion 31 in the first direction D1. The first electrode portion 31 is closer to the main surface 1*b* than the second electrode portion 32. The first electrode portion 31 is exposed at the main surface 1*a*. The second electrode portion 32 is exposed at the main surface 1*a*. The second electrode portion 32 extends from the first electrode portion 31 to the imaginary planes VP11, VP12, and VP13 when viewed in the first direction D1. The second electrode portion 32 includes an outer edge 32*p*. The outer edge 32*p* coincides with the imaginary plane VP14 when viewed in the first direction D1. The outer edge 32*p* is exposed at the side surface 1*d*, for example. The imaginary plane VP14 with respect to the external electrode 30 includes the same positional relationship as the imaginary plane VP13 with respect to the external electrode 20.

The second electrode portion 32 includes a first side portion 32*e*, a second side portion 32*f*, and a third side portion 32*d*. The first side portion 32*e* includes an outer edge 32*q* coinciding with the imaginary plane VP11 when viewed in the first direction D1. The second side portion 32*f* includes an outer edge 32*r* coinciding with the imaginary plane VP12 when viewed in the first direction D1. The third side portion 32*d* includes an outer edge 32*p* coinciding with the imaginary plane VP14 when viewed in the first direction D1.

The external electrode 30 includes a third electrode portion 33. The third electrode portion 33 is continuous with the first electrode portion 31 and is separated from the second electrode portion 32 in the first direction D1. The third electrode portion 33 includes an outer edge 33*p*. The outer edge 33*p* coincides with the imaginary plane VP14 when viewed in the first direction D1. The third electrode portion 33 includes an upper edge 33*b* and a lower edge 33*a* opposing each other in the first direction D1. The upper edge 33*b* and the lower edge 33*a* define both end portions of the third electrode portion 33 in the first direction D1.

The third electrode portion 33 includes a first side portion 33*e*, a second side portion 33*f*, and a third side portion 33*d*. The first side portion 33*e* includes an outer edge 33*q* coinciding with the imaginary plane VP11 when viewed in the first direction D1. The second side portion 33*f* includes an outer edge 33*r* coinciding with the imaginary plane VP12 when viewed in the first direction D1. The third side portion 33*d* includes an outer edge 33*p* coinciding with the imaginary plane VP14 when viewed in the first direction D1. The outer edge 33*p* is exposed at the side surface 1*d*, for example. In this case, the third electrode portion 33 is buried in the element body 1 except for the outer edge 33*p*. The upper edge 33*b* and the lower edge 33*a* are also buried in the element body 1.

The external electrode 30 includes a fourth electrode portion 34 and a fifth electrode portion 35. The fourth electrode portion 34 is continuous with the first side portion and the second side portion of the second electrode portion 32. The fourth electrode portion 34 is exposed at the main surface 1*a*. The fourth electrode portion 34 is separated from the side surface 1*c* when viewed in the first direction D1. The fifth electrode portion 35 is continuous with the first electrode portion 31. The fifth electrode portion 35 is separated from the fourth electrode portion 34 in the first direction D1. The element body 1 includes a part between the fourth electrode portion 34 and the fifth electrode portion 35.

In the present embodiment, a thickness of each of the third electrode portions 23 and 33 is, for example, 5 to 25 μm. A thickness of the element body 1 between the third electrode portions 23 and 33 and the second electrode portions 22 and 32 is, for example, 5 to 25 μm. A thickness of each of the second electrode portions 22 and 32 is, for example, 5 to 25 μm. A thickness of each of the fourth electrode portions 24 and 34 is, for example, 5 to 25 μm. A thickness of the element body 1 between the fourth electrode portions 24 and 34 and the fifth electrode portions 25 and 35 is, for example, 5 to 25 μm. A thickness of each of the fifth electrode portions 25 and 35 is, for example, 5 to 25 μm.

As illustrated in FIG. 2, when viewed in the third direction D3, a distance L1 between the second connection conductor 14 and the second coil portion 12 in the second direction D2 is larger than a distance L2 between the second connection conductor 14 and the first coil portion 11 in the second direction D2. When viewed in the third direction D3, the second coil portion 12 is separated from the second connection conductor 14 more than the first coil portion 11. In the present embodiment, the distance L1 is the shortest distance between the second connection conductor 14 and the second coil portion 12. The distance L2 is the shortest distance between the second connection conductor 14 and the first coil portion 11. In FIG. 2, the distance L1 and the distance L2 are illustrated as an example for convenience, and may be different from the actual shortest distance.

The diameter of the first coil portion 11 is different from the diameter of the second coil portion 12. The diameter of the first coil portion 11 is larger than the diameter of the second coil portion 12, for example. When viewed in the first direction D1, the coil axis of the first coil portion 11 and the coil axis of the second coil portion 12 do not coincide with each other. When viewed in the first direction D1, the coil axis of the second coil portion 12 is closer to the side surface 1*c* than the coil axis of the first coil portion 11, for example. When viewed in the first direction D1, the outer edge of the first coil portion 11 closer to the side surface 1*c* coincides with, for example, the outer edge of the second coil portion 12 closer to the side surface 1*c*. Therefore, when viewed in the first direction D1, parts of the coil conductor layer 10*b* and the coil conductor layer 10*d* constituting the first coil portion 11 overlap, for example, parts of the coil conductor layer 10*e* and the coil conductor layer 10*h* constituting the second coil portion 12.

The second coil portion 12 does not overlap with, for example, the external electrode 30 when viewed in the first direction D1. Therefore, the second coil portion 12 is disposed, for example, at a position different from the external electrode 30 when viewed in the first direction D1. When viewed in the first direction D1, the coil conductor layers 10*e* to 10*h* do not overlap, for example, the external electrode 30.

In the present embodiment, the coil 10, the first connection conductor 13 and the second connection conductor 14, and the external electrodes 20 and 30 include an electrically conductive material. The electrically conductive material includes, for example, Ag, Pd, Au, Pt, Cu, Ni, Al, Mo, or W. The electrically conductive material includes, for example, an Ag—Pd alloy, an Ag—Cu alloy, an Ag—Au alloy, or an Ag—Pt alloy. The coil 10, the first connection conductor 13, and the second connection conductor 14 include, for example, the same electrically conductive material as the external electrodes 20 and 30. The coil 10, the first connection conductor 13 and the second connection conductor 14, and the external electrodes 20 and 30 include, for example, the same electrically conductive material as each other. The coil 10, the first connection conductor 13 and the second connection conductor 14, and the external electrodes 20 and 30 include, for example, electrically conductive materials different from each other.

As illustrated in FIG. 5, the multilayer inductor MD1 includes, for example, a plurality of layers 2*a* to 2*k*. For example, the layers 2*a* to 2*k* are laminated in this order to make the multilayer inductor MD1.

The layer 2*a* includes the insulator layer 3*a*. The layer 2*a* constitutes the uppermost layer of the element body 1. The main surface 2*p* of the layer 2*a* corresponds to the main surface 1*b* of the element body 1. The layer 2*b* includes the insulator layer 3*b* and the coil conductor layer 10*b* disposed in the insulator layer 3*b*. The coil conductor layer 10*b* constitutes a part of the first coil portion 11. The layer 2*c* includes the insulator layer 3*c*, and the coil conductor layer 10*c* and the second through-hole conductor layer 14*c* disposed in the insulator layer 3*c*. The coil conductor layer 10*c* constitutes a part of the first coil portion 11. The second through-hole conductor layer 14*c* constitutes a part of the second connection conductor 14. The through-hole conductor 15*a* and the through-hole conductor 15*b* are disposed between the layer 2*b* and the layer 2*c*. The through-hole conductor 15*a* connects one end of the coil conductor layer 10*b* and one end of the coil conductor layer 10*c*. The through-hole conductor 15*b* connects another end of the coil conductor layer 10*b* and the second through-hole conductor layer 14*c*.

The layer 2*d* includes the insulator layer 3*d*, and the coil conductor layer 10*d* and the second through-hole conductor layer 14*d* disposed in the insulator layer 3*d*. The coil conductor layer 10*d* constitutes a part of the first coil portion 11. The second through-hole conductor layer 14*d* constitutes a part of the second connection conductor 14. The through-hole conductor 15*c* is disposed between the layer 2*c* and the layer 2*d*. The through-hole conductor 15*c* connects another end of the coil conductor layer 10*c* and one end of the coil conductor layer 10*d*.

The layer 2*e* includes the insulator layer 3*e*, and the coil conductor layer 10*e* and the second through-hole conductor layer 14*e* disposed in the insulator layer 3*e*. The coil conductor layer 10*e* constitutes a part of the second coil portion 12. The second through-hole conductor layer 14*e* constitutes a part of the second connection conductor 14. The through-hole conductor 15*d* is disposed between the layer 2*d* and the layer 2*e*. The through-hole conductor 15*d* connects another end of the coil conductor layer 10*d* and one end of the coil conductor layer 10*e*.

The layer 2*f* includes the insulator layer 3*f*, and the coil conductor layer 10*f* and the second through-hole conductor layer 14*f* disposed in the insulator layer 3*f*. The coil conductor layer 10*f* constitutes a part of the second coil portion 12. The second through-hole conductor layer 14*f* constitutes a part of the second connection conductor 14. The through-hole conductor 15*e* is disposed between the layer 2*e* and the layer 2*f*. The through-hole conductor 15*e* connects another end of the coil conductor layer 10*e* and one end of the coil conductor layer 10*f*.

The layer 2*g* includes the insulator layer 3*g*, and the coil conductor layer 10*g* and the second through-hole conductor layer 14*g* disposed in the insulator layer 3*g*. The coil conductor layer 10*g* constitutes a part of the second coil portion 12. The second through-hole conductor layer 14*g* constitutes a part of the second connection conductor 14. The through-hole conductor 15*f* is disposed between the layer 2*f* and the layer 2*g*. The through-hole conductor 15*f* connects t another end of the coil conductor layer 10*f* and one end of the coil conductor layer 10*g*.

The layer 2*h* includes the insulator layer 3*h*, and the coil conductor layer 10*h* and the second through-hole conductor layer 14*h* disposed in the insulator layer 3*h*. The coil conductor layer 10*h* constitutes a part of the second coil portion 12. The second through-hole conductor layer 14*h* constitutes a part of the second connection conductor 14. The through-hole conductor 15*g* is disposed between the layer 2*g* and the layer 2*h*. The through-hole conductor 15*g* connects another end of the coil conductor layer 10*g* and one end of the coil conductor layer 10*h*.

The layer 2*i* includes the insulator layer 3*i*, and the first through-hole conductor layer 13*i* and the second through-hole conductor layer 14*i* disposed in the insulator layer 3*i*. The first through-hole conductor layer 13*i* constitutes a part of the first connection conductor 13. The second through-hole conductor layer 14*i* constitutes a part of the second connection conductor 14. The through-hole conductor 15*h* is disposed between the layer 2*h* and the layer 2*i*. The through-hole conductor 15*h* connects another end of the coil conductor layer 10*h* and the first through-hole conductor layer 13*i*. The layer 2*j* includes the insulator layer 3*j*, and the first through-hole conductor layer 13*j* and the second through-hole conductor layer 14*j* disposed in the insulator layer 3*j*.

The layer 2*k* includes the insulator layer 3*k*, and electrode patterns 16*a* and 16*b* and electrode patterns 17*a* and 17*b* disposed on both sides of the insulator layer 3*k* in the first direction D1. The electrode pattern 16*a* forms the first electrode portion 21, the third electrode portion 23, and the fifth electrode portion 25. The electrode pattern 16*b* constitutes the second electrode portion 22 and the fourth electrode portion 24. The electrode pattern 17*a* constitutes the first electrode portion 31, the third electrode portion 33, and the fifth electrode portion 35. The electrode pattern 17*b* constitutes the second electrode portion 32 and the fourth electrode portion 34. An opening 18*a* through which the electrode pattern 16*a* and the electrode pattern 16*b* are joined to each other is formed in the insulator layer 3*k*. An opening 18*b* through which the electrode pattern 17*a* and the electrode pattern 17*b* are joined to each other is formed in the insulator layer 3*k*.

Due to pressurization of a green sheet described later, the electrode pattern 16*a* includes a configuration pressed into the insulator layer 3*k* in which the opening 18*a* is formed, and processed into the first electrode portion 21, the third electrode portion 23, and the fifth electrode portion 25. The first electrode portion 21 is continuous with the second electrode portion 22 through, for example, the opening 18*a*. Due to pressurization of a green sheet described later, the electrode pattern 17*a* includes a configuration pressed into the insulator layer 3*k* in which the opening 18*b* is formed, and processed into the first electrode portion 31, the third electrode portion 33, and the fifth electrode portion 35. The first electrode portion 31 is continuous with the second electrode portion 22 through, for example, the opening 18*b*. The layer 2*k* constitutes the lowermost layer of the element body 1, and a main surface 2*q* of the layer 2*k* corresponds to the main surface 1*a* of the element body 1.

The configurations of the external electrodes 20 and 30 will be further described with reference to FIGS. 6 to 8. As illustrated in FIGS. 6 and 7, the external electrode 20 includes, for example, an electrode layer 26 disposed on the outer surface of the element body 1. The electrode layer 26 is formed on the third electrode portion 23. The electrode layer 26 is disposed, for example, on the side surface 1*c* where the outer edge 23*p* is exposed. The electrode layer 26 may be disposed on the side surface 1*e* where the outer edge 23*q* is exposed. The electrode layer 26 may be disposed on the side surface 1*f* where the outer edge 23*r* is exposed. For example, when the outer edge 23*p* is exposed at the side surface 1*c*, the electrode layer 26 is disposed on the side surface 1*c*. For example, when the outer edge 23*q* is exposed at the side surface 1*e*, the electrode layer 26 is disposed on the side surface 1*e*. For example, when the outer edge 23*r* is exposed at the side surface 1*f*, the electrode layer 26 is disposed on the side surface 1*f*. The electrode layer 26 is exposed at the side surfaces 1*c*, 1*e*, and 1*f*.

For example, the electrode layer 26 is joined to the outer edges 23*p*, 23*q*, and 23*r*. For example, the electrode layer 26 is in contact with a region that is included in at least one of the side surfaces 1*c*, 1*e*, and 1*f* where the outer edges 23*p*, 23*q*, and 23*r* are exposed and surrounds the outer edges 23*p*, 23*q*, and 23*r*. For example, when the outer edge 23*p* is exposed at the side surface 1*c*, the electrode layer 26 is in contact with a region that is included in the side surface 1*c* and surrounds the outer edge 23*p*. A first width W1 of the electrode layer 26 in the first direction D1 is larger than a second width W2 of the third electrode portion 23 in the first direction D1 at the outer edge 23*p* of the third electrode portion 23. For example, the electrode layer 26 may be formed to cover the outer edges 23*p*, 23*q*, and 23*r* exposed at the element body 1 of the second electrode portion 22.

FIG. 6 illustrates an example of the electrode layer 26 disposed on the side surface 1*c*. The electrode layer 26 may extend in the third direction D3 between a ridge defined by the side surface 1*c* and the side surface 1*e* and a ridge defined by the side surface 1*c* and the side surface 1*f*. For example, when the outer edges 23*p* and 23*q* are exposed at the side surfaces 1*c* and 1*e*, respectively, the electrode layer 26 on the side surface 1*c* may be connected to the electrode layer 26 on the side surface 1*e* at the ridge defined by the side surface 1*c* and the side surface 1*e*. For example, when the outer edge 23*p* is exposed at the side surface 1*c* and the outer edge 23*r* is exposed at the side surface 1*f*, the electrode layer 26 on the side surface 1*c* may be connected to the electrode layer 26 on the side surface 1*f* at the ridge defined by the side surface 1*c* and the side surface 1*f*. For example, when the outer edge 23*p* is exposed at the side surface 1*c*, the outer edge 23*q* is exposed at the side surface 1*e*, and the outer edge 23*r* is exposed at the side surface 1*f*, the electrode layer 26 on the side surface 1*e* is connected to the electrode layer 26 on the side surface 1*c* at the ridge defined by the side surface 1*e* and the side surface 1*c*. The electrode layer 26 on the side surface 1*c* may be connected to the electrode layer 26 on the side surface 1*f* at the ridge defined by the side surface 1*c* and the side surface 1*f*.

The external electrode 30 may include the same configuration as the external electrode 20. That is, the external electrode 30 includes, for example, another electrode layer disposed on the outer surface of the element body 1. In the present embodiment, illustration of the electrode layer included in the external electrode 30 is omitted. The other electrode layer described above is formed on the third electrode portion 33. The other electrode layer described above is formed on at least one of the side surface 1*d* and the side surfaces 1*e* and 1*f*. For example, when the outer edge 33*p* is exposed at the side surface 1*d*, the other electrode layer described above is formed on the side surface 1*d*. The other electrode layer described above is exposed at the side surfaces 1*d*, 1*e*, and 1*f*. The first width of the other electrode layer described above in the first direction D1 is larger than the second width of the third electrode portion 33 in the first direction D1 at the outer edge 33*p* of the third electrode portion 33.

The electrode layer 26 and the other electrode layer described above include, for example, a Ni plated film, a Sn plated film, a Cu plated film, or an Au plated film. The electrode layer 26 and the other electrode layer described above may include a multilayer configuration of these plated films. The electrode layer 26 and the other electrode layer described above may include, for example, a Ni plated film and an Au plated film formed on the Ni plated film. The electrode layer 26 and the other electrode layer described above have a thickness of, for example, 5 to 15 μm.

As illustrated in FIG. 7, the electrode layer 26 is formed on the second electrode portion 22, for example, at the outer edge 22*p* of the second electrode portion 22. The second electrode portion 22 includes, for example, an outer edge 22*p* coinciding with the imaginary plane VP13 when viewed in the first direction D1. In the electrode layer 26 illustrated in FIG. 7, as compared with the example illustrated in FIG. 6, the first width W1 of the electrode layer 26 in the first direction D1 is larger than the second width W2 of the third electrode portion 23 in the first direction D1 at the outer edge 23*p* of the third electrode portion 23. FIG. 7 illustrates the electrode layer 26 when the outer edge 23*p* is exposed at the side surface 1*c*. Also in the external electrode 30, the electrode layer of the external electrode 30 may be formed on the second electrode portion 32 at the outer edge 32*p* of the second electrode portion 32.

As illustrated in FIG. 8, the second electrode portion 22 includes, for example, a first portion 22*a* and a second portion 22*b*. The first portion 22*a* is continuous with the first electrode portion 21 in the first direction D1. The first portion 22*a* is continuous with the first electrode portion 21, and is made integrally with the first electrode portion 21, for example. The first portion 22*a* overlaps at least a part of the first electrode portion 21 when viewed in the first direction D1. The first portion 22*a* is exposed at the main surface 1*a*, for example. The second portion 22*b* is located in the element body 1. The second portion 22*b* is located, for example, closer to the outer edge 22*p* than the first portion 22*a*. The second portion 22*b* includes the outer edge 22*p*. The third electrode portion 23 and the second portion 22*b* are separated from each other in the first direction D1. As illustrated in FIG. 8, the outer edge 22*p* may be separated from the side surface 1*c* without being exposed at the side surface 1*c*. The second portion 22*b* is located, for example, in the element body 1. For example, a plated film 27 may be formed on the outer edges that are included in the second electrode portion 22 and the third electrode portion 23 and are exposed at the element body 1. The plated film 27 includes, for example, the same material as the electrode layer 26.

The second electrode portion 32 includes, for example, a first portion and a second portion. The first portion is continuous with the first electrode portion 31 in the first direction D1. The first portion of the second electrode portion 32 is exposed at the main surface 1*a*, for example. The second portion of the second electrode portion 32 is located, for example, closer to the outer edge 32*p* than the first portion. The second portion of the second electrode portion 32 is located, for example, in the element body 1.

An example of a method for making the multilayer inductor MD1 will be described. The order of the processes of the making method may be interchanged with each other. In an example of the making method, first, slurry is prepared. The slurry includes, for example, an insulating resin and a solvent. The insulating resin includes, for example, an acrylic resin or a butyral resin. The solvent includes, for example, ethyl carbitol or butyl carbitol.

Next, the slurry is applied onto a base due to, for example, a doctor blade method to form a green sheet. The base includes, for example, polyethylene terephthalate (PET). The green sheet is used to form the insulator layers 3*a* to 3*k*. Next, for example, through holes for forming the through-hole conductors 15*a* to 15*h*, the first through-hole conductor layers 13*i* and 13*j*, and the second through-hole conductor layers 14*c* to 14*j* are formed. The through holes are formed, for example, by irradiating the green sheet with laser light.

Next, electrically conductive paste is filled in the through holes formed in the green sheet. The electrically conductive paste filled in the through holes includes, for example, metal powder, a glass component, an alkali metal, an organic binder, and an organic solvent. The metal powder includes, for example, Ag particles or Ag—Pd alloy particles. After filling the electrically conductive paste, conductors for forming the coil conductor layers 10*b* to 10*h* are disposed on the green sheet. The conductors forming the coil conductor layers 10*b* to 10*h* are disposed on the green sheet to be connected to the electrically conductive paste filled in the through holes.

Next, electrically conductive paste for forming the first electrode portions 21 and 31, the third electrode portions 23 and 33, and the fifth electrode portions 25 and 35 is applied onto one surface of the green sheet that pushes the electrode patterns 16*a* and 17*a*. The green sheet that pushes the electrode patterns 16*a* and 17*a* includes, for example, the same material as other green sheets. Electrically conductive paste for forming the second electrode portions 22 and 32 and the fourth electrode portions 24 and 34 is applied onto another surface of the green sheet that pushes the electrode patterns 16*a* and 17*a*. The electrically conductive paste for forming the external electrodes 20 and 30 includes, for example, metal powder, a glass component, an alkali metal, an organic binder, and an organic solvent. The metal powder includes, for example, Ag particles or Ag—Pd alloy particles.

Next, the respective green sheets are laminated. The green sheets are, for example, each peeled from the base and then laminated. Each of the laminated green sheets is pressurized in the first direction D1 in which the green sheets are laminated. After the laminated green sheets are pressurized, a laminated body in which the conductors forming the coil conductor layers 10*b* to 10*h* overlap each other when viewed in the first direction D1 is formed.

The pressurization of the green sheet pushes the electrically conductive paste forming the electrode patterns 16*a* and 16*b* into the green sheet forming the insulator layer 3*k*. In the green sheet forming the insulator layer 3*k*, through holes forming the openings 18*a* and 18*b* are formed. The electrically conductive paste for forming the electrode patterns 16*a* and 16*b* is pressed only with a portion of the green sheet for forming the insulator layer 3*k* other than the through holes for forming the openings 18*a* and 18*b*. As a result, the third electrode portions 23 and 33 and the fifth electrode portions 25 and 35 are formed in a region that is included in the green sheet forming the insulator layer 3*k* and is pressed into by the peripheral portion of the through holes. A region that is not pressed into by the peripheral portion of the through holes forms the first electrode portions 21 and 31.

As illustrated in FIGS. 4A, 4B, and 5, for example, in the formation of the external electrode 20, pushing into the electrically conductive paste forming the electrode pattern 16*a* forms the first side portion 23*e*, the second side portion 23*f*, and the third side portion 23*c* of the third electrode portion 23, and the fifth electrode portion 25. In the green sheet forming the insulator layer 3*k*, a region that is not pressed into by the peripheral portion of the through hole forms the first electrode portion 21. The electrically conductive paste for forming the first electrode portion 21 is joined to the electrically conductive paste for forming the second electrode portion 22 through a through hole for forming the opening 18*a*, for example. The second electrode portion 22 is continuous with the first electrode portion 21 by joining of the electrically conductive paste.

Next, the laminated body is subjected to heat treatment to form a multilayer inductor array. The multilayer inductor array is cut into a predetermined size with, for example, a cutting machine to make the multilayer inductor MD1. In the present embodiment, for example, the electrode layer 26 and the other electrode layer described above may be formed through a plating method on the multilayer inductor MD1 after cutting. The electrode layer 26 and the other electrode layer described above are formed through, for example, an electrolytic plating method or an electroless plating method.

As described above, the multilayer inductor MD1 includes the element body 1, the coil 10 disposed in the element body 1, and the external electrodes 20 and 30 disposed on the element body 1 and electrically connected to the coil 10. The element body 1 includes the main surface 1*a* arranged to constitute a mounting surface, and the side surface 1*c*, 1*d*, 1*e*, and 1*f* located on the imaginary planes VP11, VP12, VP13, and VP14 adjacent to the main surface 1*a* and orthogonal to the main surface 1*a*. The external electrode 20 includes the first electrode portions 21 and 31, the second electrode portions 22 and 32, and the third electrode portions 23 and 33. In the first electrode portions 21 and 31, the external electrode 20 is exposed at the main surface 1*a*. The second electrode portions 22 and 32 are continuous with the first electrode portions 21 and 31 and exposed at the main surface 1*a*, and are located to extend from the first electrode portions 21 and 31 to the imaginary planes when viewed in the direction orthogonal to the main surface 1*a*. The third electrode portions 23 and 33 are continuous with the first electrode portions 21 and 31, are separated from the second electrode portions 22 and 32 in the direction orthogonal to the main surface 1*a*, and include the outer edges coinciding with the imaginary planes when viewed in the direction orthogonal to the main surface 1*a*. The element body includes a part between the second electrode portions 22 and 32 and the third electrode portions 23 and 33.

In the multilayer inductor MD1, the external electrodes 20 and 30 include the second electrode portions 22 and 32 and the third electrode portions 23 and 33 that is continuous with the first electrode portions 21 and 31. The third electrode portion 23 includes the outer edges coinciding with the imaginary planes VP11, VP12, and VP13. The side surface 1*c*, 1*e*, and 1*f* of the element body 1 adjacent to the main surface 1*a* is located on the imaginary planes VP11, VP12, and VP13. The third electrode portion 23 includes the outer edges coinciding with the imaginary planes VP11, VP12, and VP13. The second electrode portion 32 and the third electrode portion 33 include the outer edges coinciding with the imaginary planes VP11, VP12, and VP14. The side surface 1*d*, 1*e*, and 1*f* of the element body 1 adjacent to the main surface 1*a* is located on the imaginary planes VP11, VP12, and VP14. The third electrode portion 33 located in the element body 1 includes the outer edges coinciding with the imaginary planes VP11, VP12, and VP14. Therefore, the multilayer inductor MD1 further prevents peeling-off of the external electrodes 20 and 30 from the element body 1.

In the multilayer inductor MD1, the external electrode 20 includes the electrode layer 26 formed on the third electrode portion 23 and exposed at the side surface 1*c*. The first width W1 of the electrode layer 26 in the direction orthogonal to the main surface 1*a* is larger than the second width W2 of the third electrode portion 23 in the direction orthogonal to the main surface 1*a* at the outer edge of the third electrode portion 23.

In the configuration in which the first width W1 is larger than the second width W2, the electrode layer 26 exposed at the side surface 1*c* can generate the anchor effect. Therefore, this configuration certainly realizes further prevention of peeling-off of the external electrode 20 from the element body 1.

In the multilayer inductor MD1, the second electrode portion 22 includes the outer edges coinciding with the imaginary planes when viewed in the direction orthogonal to the main surface 1*a*, and the electrode layer 26 is formed on the second electrode portion 22 at the outer edge of the second electrode portion 32.

In the configuration in which the electrode layer 26 is formed on the second electrode portion 32 at the outer edges of the second electrode portion 22, the anchor effect is further improved. Therefore, this configuration more certainly realizes further prevention of peeling-off of the external electrode 20 from the element body 1.

In the multilayer inductor MD1, the second electrode portion 22 includes the first portion 22*a* that is continuous with the first electrode portion 21 and exposed at the main surface 1*a*, and the second portion 22*b* located closer to the imaginary plane than the first portion 22*a*, and the second portion 22*b* is located in the element body 1.

In the configuration in which the second portion 22*b* is located in the element body 1, the contact area between the second electrode portion 22 and the element body 1 can be increased. Therefore, this configuration more certainly realizes further prevention of peeling-off of the external electrode 20 from the element body 1.

In the multilayer inductor MD1, the side surface 1*c*, 1*e*, and 1*f* includes a first side surface 1*e*, a second side surface 1*f*, and a third side surface 1*c*. The first side surface 1*e* is located on the imaginary plane VP11 orthogonal to the main surface 1*a*. The second side surface 1*f* faces the first side surface 1*e* and is located on the imaginary plane VP12. The imaginary plane VP12 is orthogonal to the main surface 1*a* and faces the imaginary plane VP11. The third side surface 1*c* is adjacent to the first side surface 1*e* and the second side surface 1*f* and is located on the imaginary plane VP13. The imaginary plane VP13 is orthogonal to the main surface 1*a*, the imaginary plane VP11, and the imaginary plane VP12. The second electrode portion 22 includes the first side portion 22*e* including the outer edge coinciding with the imaginary plane VP11 when viewed in the direction orthogonal to the main surface 1*a*, the second side portion 22*f* including the outer edge coinciding with the imaginary plane VP12 when viewed in the direction orthogonal to the main surface 1*a*, and the third side portion 22*c* including the outer edge coinciding with the imaginary plane VP13 when viewed in the direction orthogonal to the main surface 1*a*. The third electrode portion 23 includes the first side portion 23*e* including the outer edge coinciding with the imaginary plane VP11 when viewed in the direction orthogonal to the main surface 1*a*, the second side portion 23*f* including the outer edge coinciding with the imaginary plane VP12 when viewed in the direction orthogonal to the main surface 1*a*, and the third side portion 23*c* including an outer edge coinciding with the imaginary plane VP13 when viewed in the direction orthogonal to the main surface 1*a*. The external electrode 20 includes the fourth electrode portion 24 and the fifth electrode portion 25. The fourth electrode portion 24 is continuous with the first electrode portion 21 and the first side portion 23*e* and the second side portion 23*f* of the second electrode portion 22, is exposed at the main surface 1*a*, and is separated from the third side surface 1*c* when viewed in the direction orthogonal to the main surface 1*a*. The fifth electrode portion 25 is continuous with the first electrode portion 21 and is separated from the fourth electrode portion 24 in the direction orthogonal to the main surface. The element body 1 includes a part between the fourth electrode portion 24 and the fifth electrode portion 25.

In the multilayer inductor MD1, the second electrode portion 22 and the third electrode portion 23 include the outer edges coinciding with the three imaginary planes VP11, VP12, and VP13 orthogonal to each other. The second electrode portion 32 includes the outer edges coinciding with the three imaginary planes VP11, VP12, and VP13 orthogonal to each other. The side surface 1*c*, 1*e*, and 1*f* adjacent to the main surface 1*a* is located on the three imaginary planes VP11, VP12, and VP13, and the second electrode portion 22 and the third electrode portion 23 include the outer edges coinciding with the imaginary planes VP11, VP12, and VP13. The third electrode portion 33 includes the outer edges coinciding with the three imaginary planes VP11, VP12, and VP14 orthogonal to each other. The side surface 1*d*, 1*e*, and 1*f* adjacent to the main surface 1*a* is located on the three imaginary planes VP11, VP12, and VP14, and the second electrode portion 32 and the third electrode portion 33 include the outer edges coinciding with the imaginary planes VP11, VP12, and VP14. The element body 1 includes a part between the fourth electrode portions 24 and 34 and the fifth electrode portions 25 and 35. Therefore, the multilayer inductor MD1 more certainly prevents the peeling-off of the external electrodes 20 and 30 from the element body 1.

Figure 9:
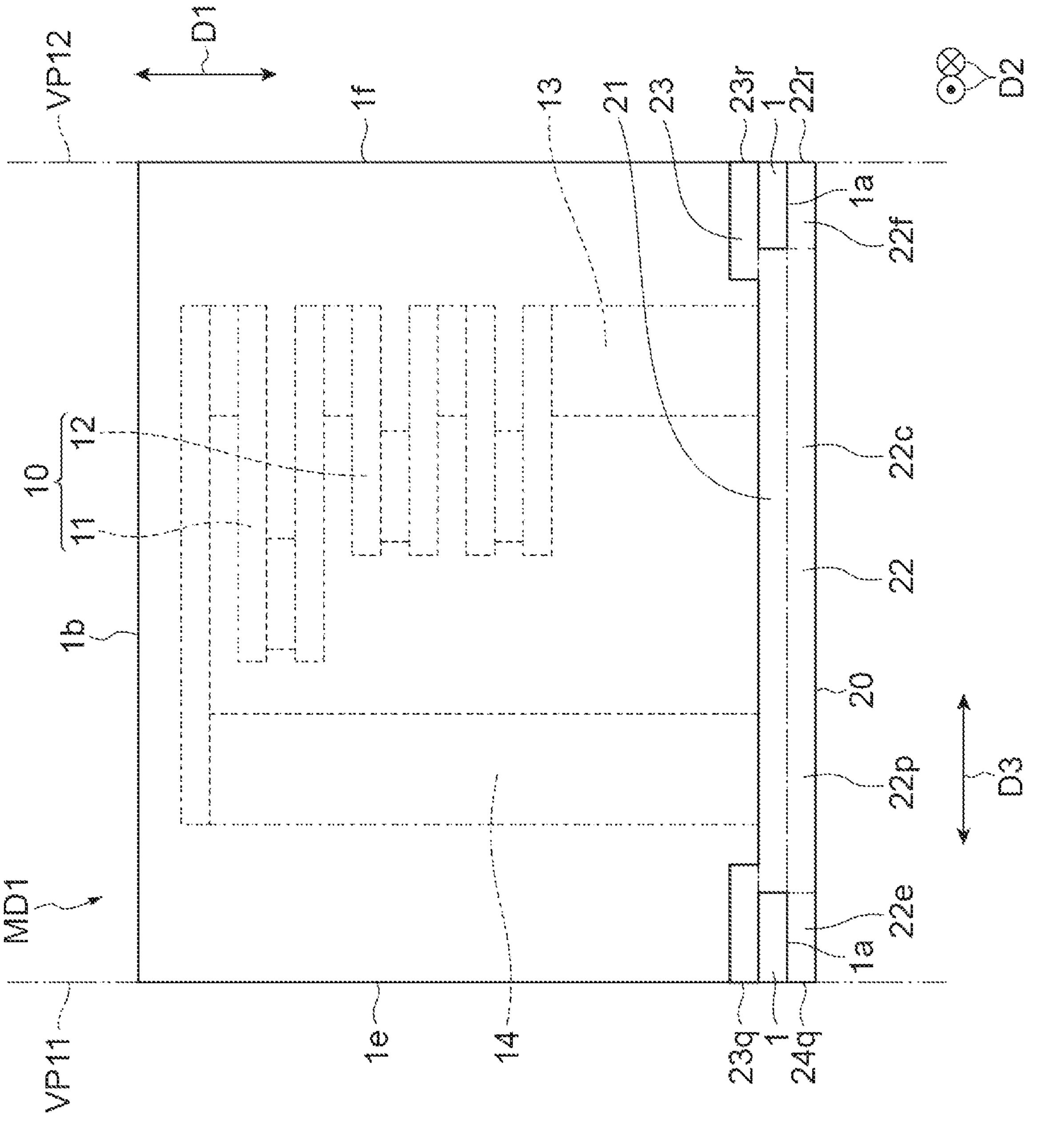
FIG. 9 is a side view illustrating a multilayer inductor according to a modification of the present embodiment.
Figure 10:
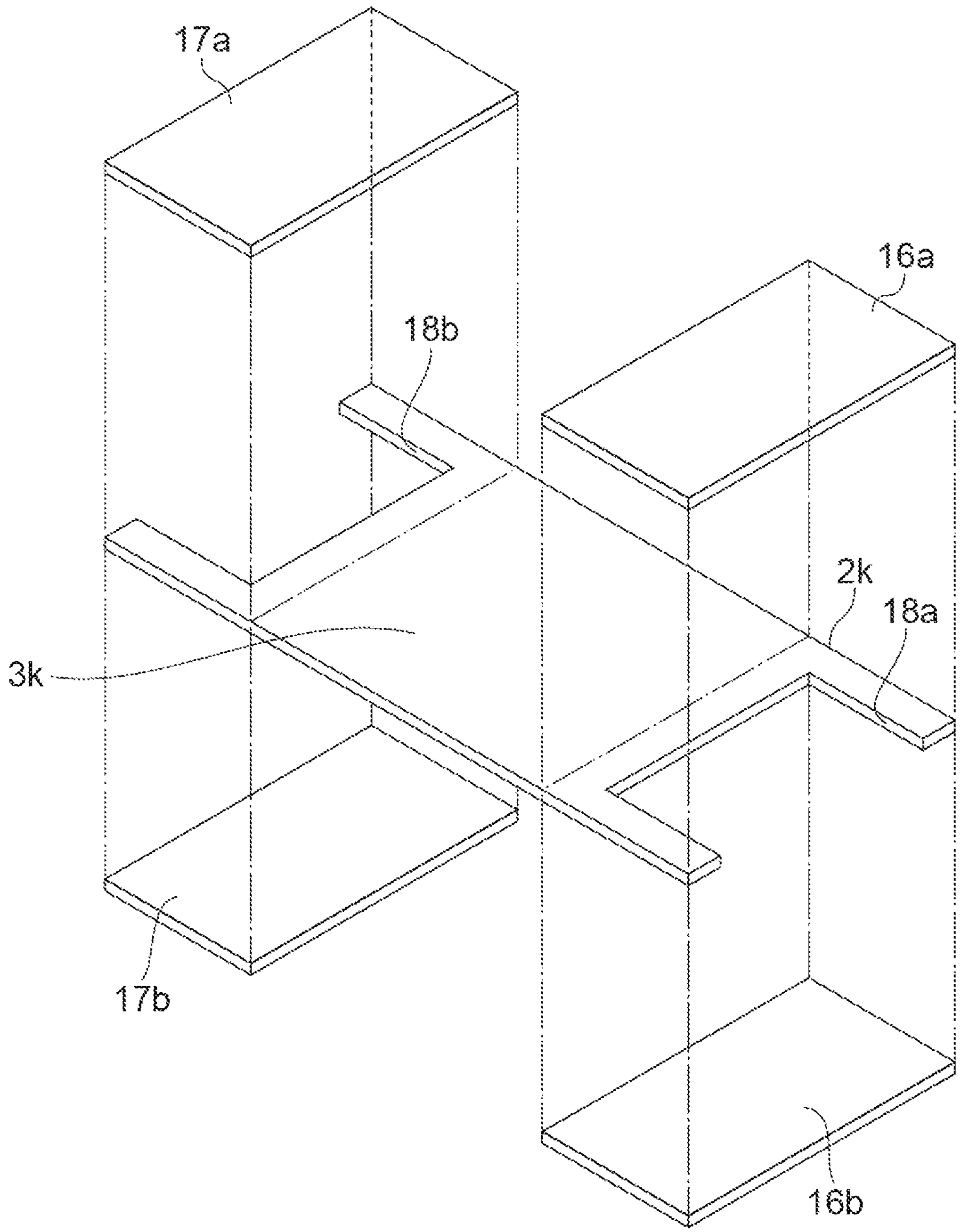
FIG. 10 is an exploded perspective view illustrating the external electrodes.
Figure 11A:
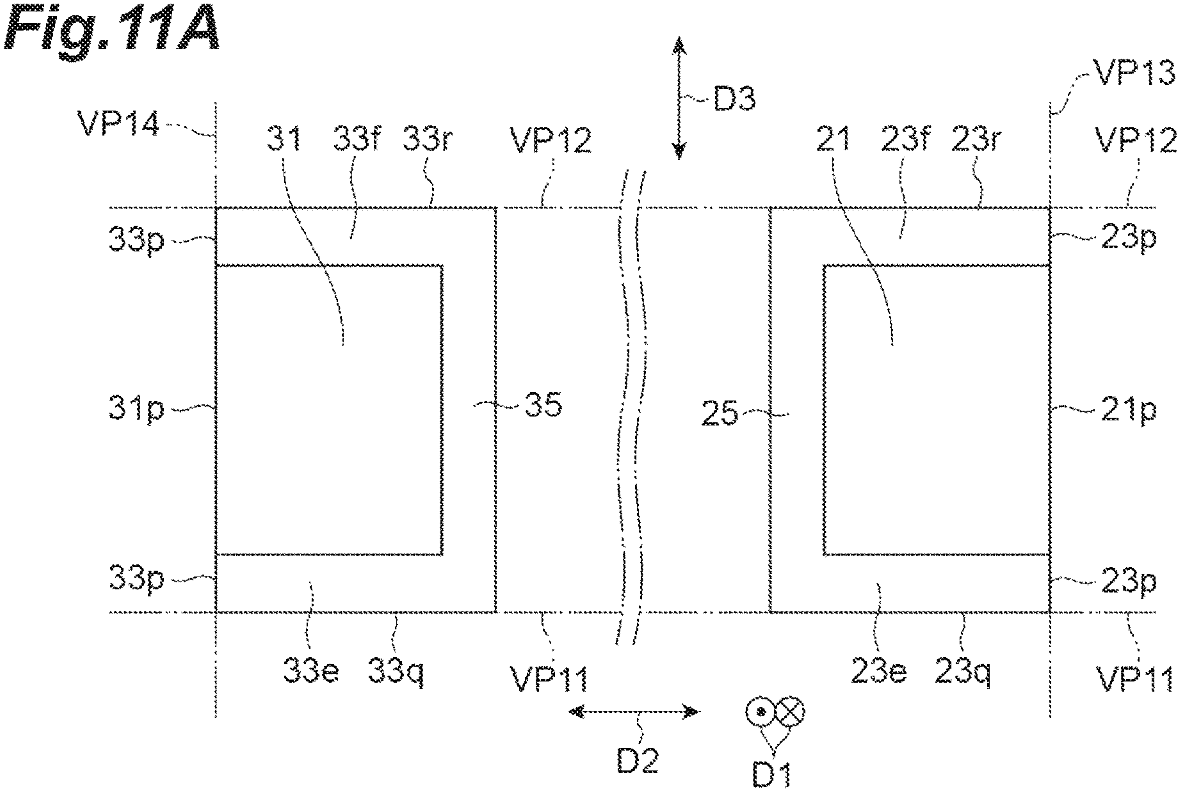
FIG. 11A is a plan view illustrating the first electrode portion, the third electrode portion, and the fifth electrode portion of each of the external electrodes.
Figure 11B:
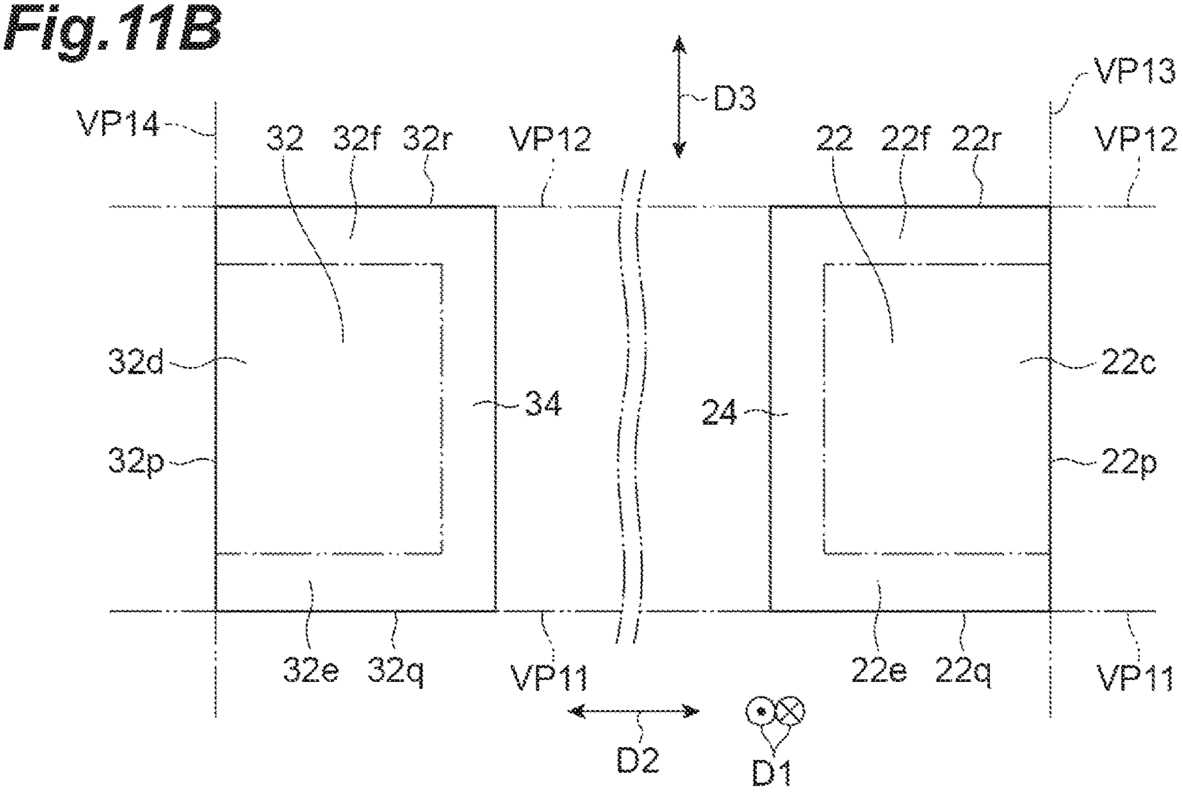
FIG. 11B is a plan view illustrating the second electrode portion and the fourth electrode portion of each of the external electrodes.

Next, a modification of the multilayer inductor MD1 according to the present embodiment will be described with reference to FIGS. 9 to 11B. FIG. 9 is a side view illustrating a multilayer inductor MD1 according to a modification of the present embodiment. FIG. 10 is an exploded perspective view illustrating the external electrodes 20 and 30. FIG. 11A is a plan view illustrating the first electrode portion, the third electrode portion, and the fifth electrode portion of each of the external electrodes. FIG. 11B is a plan view illustrating the second electrode portion and the fourth electrode portion of each of the external electrodes. The multilayer inductor MD1 according to the present modification includes the same configuration as the multilayer inductor MD1 according to the above-described embodiment except for the configurations of the external electrodes 20 and 30.

The external electrodes 20 and 30 are disposed on the element body 1. The external electrode 20 is disposed, for example, near the side surface 1*c*. The external electrode 30 is disposed, for example, near the side surface 1*d*. The external electrode 20 and the external electrode 30 are, for example, separated from each other in the second direction D2. Hereinafter, differences between the present embodiment described above and the present modification will be mainly described.

The external electrode 20 includes the first electrode portion 21 and the second electrode portion 22. The second electrode portion 22 is continuous with the first electrode portion 21 in the first direction D1. The first electrode portion 21 is closer to the main surface 1*b* than the second electrode portion 22. The first electrode portion 21 is exposed at the main surface 1*a*. The second electrode portion 22 is exposed at the main surface 1*a*. The second electrode portion 22 includes the outer edge 22*p*. The outer edge 22*p* coincides with the imaginary plane VP13 when viewed in the first direction D1.

The second electrode portion 22 includes the first side portion 22*e*, the second side portion 22*f*, and the third side portion 22*c*. The first side portion 22*e* includes the outer edge 22*q* coinciding with the imaginary plane VP11 when viewed in the first direction D1. The second side portion 22*f* includes the outer edge 22*r* coinciding with the imaginary plane VP12 when viewed in the first direction D1. The third side portion 22*c* includes the outer edge 22*p* coinciding with the imaginary plane VP13 when viewed in the first direction D1.

The external electrode 20 includes the third electrode portion 23. The third electrode portion 23 is continuous with the first electrode portion 21 and is separated from the second electrode portion 22 in the first direction D1. The third electrode portion 23 includes two outer edges 23*p*. The outer edges 23*p* coincide with the imaginary plane VP13 when viewed in the first direction D1. In the present modification, the first electrode portion 21 extends to, for example, the side surface 1*c*. The first electrode portion 21 includes an outer edge 21*p* coinciding with the imaginary plane VP13 when viewed in the first direction D1. When viewed in the first direction D1, the outer edge 21*p* is disposed between the two outer edges 23*p*.

The third electrode portion 23 includes a first side portion 23*e* and a second side portion 23*f*. The first side portion 23*e* includes the outer edge 23*q* coinciding with the imaginary plane VP11 when viewed in the first direction D1. The second side portion 23*f* includes the outer edge 23*r* coinciding with the imaginary plane VP12 when viewed in the first direction D1.

The external electrode 20 includes the fourth electrode portion 24 and the fifth electrode portion 25. The fourth electrode portion 24 is continuous with the first side portion 22*e* and the second side portion 22*f* of the second electrode portion 22. The fourth electrode portion 24 is exposed at the main surface 1*a*. The fourth electrode portion 24 is separated from the side surface 1*c* when viewed in the first direction D1. The fifth electrode portion 25 is continuous with the first electrode portion 21. The fifth electrode portion 25 is separated from the fourth electrode portion 24 in the first direction D1. The element body 1 includes a part between the fourth electrode portion 24 and the fifth electrode portion 25.

As illustrated in FIGS. 10, 11A, and 11B, in the external electrode 20, pushing into the electrically conductive paste forming the electrode pattern 16*a* forms the first side portion 23*e* and the second side portion 23*f* of the third electrode portion 23, and the fifth electrode portion 25. When the electrically conductive paste for forming the electrode pattern 16*a* is pressed, a region that is not pressed forms the first electrode portion 21. The electrically conductive paste for forming the first electrode portion 21 is joined to the electrically conductive paste for forming the second electrode portion 22 through the through hole for forming the opening 18*a*, for example.

The external electrode 30 includes the first electrode portion 31 and the second electrode portion 32. The second electrode portion 32 is continuous with the first electrode portion 31 in the first direction D1. The first electrode portion 31 is closer to the main surface 1*b* than the second electrode portion 32. The first electrode portion 31 is exposed at the main surface 1*a*. The second electrode portion 32 is exposed at the main surface 1*a*. The second electrode portion 32 includes the outer edge 32*p*. The outer edge 32*p* coincides with the imaginary plane VP14 when viewed in the first direction D1.

The second electrode portion 32 includes the first side portion 32*e*, the second side portion 32*f*, and the third side portion 32*c*. The first side portion 32*e* includes the outer edge 32*q* coinciding with the imaginary plane VP11 when viewed in the first direction D1. The second side portion 32*f* includes the outer edge 32*r* coinciding with the imaginary plane VP12 when viewed in the first direction D1. The third side portion 32*c* includes the outer edge 32*p* coinciding with the imaginary plane VP14 when viewed in the first direction D1.

The external electrode 30 includes the third electrode portion 33. The third electrode portion 33 is continuous with the first electrode portion 31 and is separated from the second electrode portion 32 in the first direction D1. The third electrode portion 33 includes two outer edges 33*p*. The outer edges 33*p* coincide with the imaginary plane VP14 when viewed in the first direction D1. In the present modification, the first electrode portion 31 extends to, for example, the side surface 1*d*. The first electrode portion 31 includes an outer edge 31*p* coinciding with the imaginary plane VP14 when viewed in the first direction D1. When viewed in the first direction D1, the outer edge 31*p* is disposed between the two outer edges 33*p*.

The third electrode portion 33 includes the first side portion 33*e* and the second side portion 33*f*. The first side portion 33*e* includes the outer edge 33*q* coinciding with the imaginary plane VP11 when viewed in the first direction D1. The second side portion 33*f* includes the outer edge 33*r* coinciding with the imaginary plane VP12 when viewed in the first direction D1.

The external electrode 30 includes the fourth electrode portion 34 and the fifth electrode portion 35. The fourth electrode portion 34 is continuous with the first side portion 32*e* and the second side portion 32*f* of the second electrode portion 32. The fourth electrode portion 34 is exposed at the main surface 1*a*. The fourth electrode portion 34 is separated from the side surface 1*d* when viewed in the first direction D1. The fifth electrode portion 35 is continuous with the first electrode portion 31. The fifth electrode portion 35 is separated from the fourth electrode portion 34 in the first direction D1. The element body 1 includes a part between the fourth electrode portion 34 and the fifth electrode portion 35.

As illustrated in FIGS. 10, 11A, and 11B, in the external electrode 30, pushing into the electrically conductive paste forming the electrode pattern 17*a* forms the first side portion 33*e* and the second side portion 33*f* of the third electrode portion 33, and the fifth electrode portion 35. When the electrically conductive paste for forming the electrode pattern 17*a* is pressed, a region that is not pressed forms the first electrode portion 31. The electrically conductive paste for forming the first electrode portion 31 is joined to the electrically conductive paste for forming the second electrode portion 32 through a through hole for forming the opening 18*b*, for example.

The multilayer inductor MD1 according to the present modification includes, for example, an electrode layer disposed on the outer surface of the element body 1. The electrode layer disposed on the outer surface of the element body 1 of the present modification is formed on the third electrode portion 23. The electrode layer disposed on the outer surface of the element body 1 of the present modification is disposed, for example, on the side surface 1*e* where the outer edge 23*q* is exposed. The electrode layer disposed on the outer surface of the element body 1 of the present modification may be disposed on the side surface 1*f* where the outer edge 23*r* is exposed. For example, when the outer edge 23*q* is exposed at the side surface 1*e* and the outer edge 23*r* is exposed at the side surface 1*f*, the electrode layer disposed on the outer surface of the element body 1 of the present modification is disposed on the side surfaces 1*e* and 1*f*. The multilayer inductor MD1 according to the present modification may include the electrode layer disposed on the outer surface of the element body 1 disposed on the outer surface of the element body 1. The other electrode layer described above is formed on the third electrode portion 33.

As described above, in the multilayer inductor MD1, the side surfaces 1*c*, 1*e*, and 1*f* include the first side surface 1*e*, the second side surface 1*f*, and the third side surface 1*c*. The first side surface 1*e* is located on the imaginary plane VP11 orthogonal to the main surface 1*a*. The second side surface 1*f* faces the first side surface 1*e* and is located on the imaginary plane VP12. The imaginary plane VP12 is orthogonal to the main surface 1*a* and faces the imaginary plane VP11. The third side surface 1*c* is adjacent to the first side surface 1*e* and the second side surface 1*f* and is located on the imaginary plane VP13. The imaginary plane VP13 is orthogonal to the main surface 1*a*, the imaginary plane VP11, and the imaginary plane VP12. The second electrode portion 22 includes the first side portion 22*e* including the outer edge coinciding with the imaginary plane VP11 when viewed in the direction orthogonal to the main surface 1*a*, the second side portion 22*f* including the outer edge coinciding with the imaginary plane VP12 when viewed in the direction orthogonal to the main surface 1*a*, and the third side portion 22*c* including the outer edge 22*p* coinciding with the imaginary plane VP13 when viewed in the direction orthogonal to the main surface 1*a*. The third electrode portion 23 includes the first side portion 23*e* including the outer edge coinciding with the imaginary plane VP11 when viewed in the direction orthogonal to the main surface 1*a* and the second side portion 23*f* including the outer edge coinciding with the imaginary plane VP12 when viewed in the direction orthogonal to the main surface 1*a*. The external electrode 20 includes the fourth electrode portion 24 and the fifth electrode portion 25. The fourth electrode portion 24 is continuous with the first electrode portion 21 and the first side portion 23*e* and the second side portion 23*f* of the second electrode portion 22, is exposed at the main surface 1*a*, and is separated from the third side surface 1*c* when viewed in the direction orthogonal to the main surface 1*a*. The fifth electrode portion 25 is continuous with the first electrode portion 21 and is separated from the fourth electrode portion 24 in the direction orthogonal to the main surface 1*a*. The element body 1 includes a part between the fourth electrode portion 24 and the fifth electrode portion 25.

In the multilayer inductor MD1, the second electrode portions 22 and 32 and the third electrode portions 23 and 33 include the outer edges coinciding with two imaginary planes VP11 and VP12 orthogonal to each other. The side surfaces 1*e* and 1*f* adjacent to the main surface 1*a* are located on the two imaginary planes VP11 and VP12, and the second electrode portions 22 and 32 and the third electrode portions 23 and 33 include the outer edges coinciding with the imaginary planes VP11 and VP12. The element body 1 includes a part between the fourth electrode portions 24 and 34 and the fifth electrode portions 25 and 35. Therefore, this configuration more certainly realizes further prevention of peeling-off of the external electrodes 20 and 30 from the element body 1.

Although the embodiments and modifications of the present invention have been described above, the present invention is not necessarily limited to the above embodiments and modifications, and various modifications can be made without departing from the gist thereof.

In the multilayer inductor MD1, the first width W1 in the direction orthogonal to the main surface 1*a* of the electrode layer 26 may not be larger than the second width W2 of the third electrode portion 23 in the direction orthogonal to the main surface 1*a* at the outer edge of the third electrode portion 23. In the configuration in which the first width W1 is larger than the second width W2, as described above, the electrode layer 26 exposed at the side surface 1*c* serves as an anchor. Therefore, this configuration certainly realizes further prevention of peeling-off of the external electrode 20 from the element body 1.

In the multilayer inductor MD1, the electrode layer 26 may not be formed on the second electrode portion 22 at the outer edge of the second electrode portion 22. In the configuration in which the electrode layer 26 is formed on the second electrode portion 22 at the outer edge of the second electrode portion 22, as described above, the anchor effect is further improved. Therefore, this configuration more certainly realizes further prevention of peeling-off of the external electrode 20 from the element body 1.

What is claimed is:

1. A multilayer inductor comprising:

an element body including a main surface arranged to constitute a mounting surface, and a side surface adjacent to the main surface and located on an imaginary plane orthogonal to the main surface;

a coil disposed in the element body; and an external electrode disposed on the element body and electrically connected to the coil, wherein the external electrode includes a first electrode portion exposed at the main surface, a second electrode portion being continuous with the first electrode portion, exposed at the main surface, and located to extend from the first electrode portion to the imaginary plane when viewed in a direction orthogonal to the main surface, and a third electrode portion being continuous with the first electrode portion, separated from the second electrode portion in the direction orthogonal to the main surface, and including an outer edge coinciding with the imaginary plane when viewed in the direction orthogonal to the main surface, and the element body includes a part between the second electrode portion and the third electrode portion.

2. The multilayer inductor according to claim 1, wherein the external electrode further includes an electrode layer formed on the third electrode portion and exposed at the side surface, and a first width of the electrode layer in the direction orthogonal to the main surface is larger than a second width of the third electrode portion in the direction orthogonal to the main surface at the outer edge of the third electrode portion.

3. The multilayer inductor according to claim 2, wherein the second electrode portion includes an outer edge coinciding with the imaginary plane when viewed in the direction orthogonal to the main surface, and the electrode layer is further formed on the second electrode portion at the outer edge of the second electrode portion.

4. The multilayer inductor according to claim 1, wherein the second electrode portion includes a first portion being continuous with the first electrode portion and exposed at the main surface, and a second portion located closer to the imaginary plane than the first portion, and the second portion is located in the element body.

5. The multilayer inductor according to claim 1, wherein the imaginary plane includes a first imaginary plane orthogonal to the main surface, a second imaginary plane orthogonal to the main surface and opposed to the first imaginary plane, and a third imaginary plane orthogonal to the main surface, the first imaginary plane, and the second imaginary plane, the side surface includes a first side surface located on the first imaginary plane, a second side surface opposed to the first side surface and located on the second imaginary plane, and a third side surface adjacent to the first side surface and the second side surface and located on the third imaginary plane, the second electrode portion includes a first side portion including an outer edge coinciding with the first imaginary plane when viewed in the direction orthogonal to the main surface, a second side portion including an outer edge coinciding with the second imaginary plane when viewed in the direction orthogonal to the main surface, and a third side portion including an outer edge coinciding with the third imaginary plane when viewed in the direction orthogonal to the main surface, the third electrode portion includes a first side portion including an outer edge coinciding with the first imaginary plane when viewed in the direction orthogonal to the main surface, a second side portion including an outer edge coinciding with the second imaginary plane when viewed in the direction orthogonal to the main surface, and a third side portion including an outer edge coinciding with the third imaginary plane when viewed in the direction orthogonal to the main surface, the external electrode further includes a fourth electrode portion being continuous with the first electrode portion and the first side portion and the second side portion of the second electrode portion, exposed at the main surface, and separated from the third side surface when viewed in the direction orthogonal to the main surface, and a fifth electrode portion being continuous with the first electrode portion and separated from the fourth electrode portion in the direction orthogonal to the main surface, and the element body may include a part between the fourth electrode portion and the fifth electrode portion.

6. The multilayer inductor according to claim 1, wherein the imaginary plane includes a first imaginary plane orthogonal to the main surface, a second imaginary plane orthogonal to the main surface and opposed to the first imaginary plane, and a third imaginary plane orthogonal to the main surface, the first imaginary plane, and the second imaginary plane, the side surface includes a first side surface located on the first imaginary plane, a second side surface opposed to the first side surface and located on the second imaginary plane, and a third side surface adjacent to the first side surface and the second side surface and located on the third imaginary plane, the second electrode portion includes a first side portion including an outer edge coinciding with the first imaginary plane when viewed in the direction orthogonal to the main surface, a second side portion including an outer edge coinciding with the second imaginary plane when viewed in the direction orthogonal to the main surface, and a third side portion including an outer edge coinciding with the third imaginary plane when viewed in the direction orthogonal to the main surface, the third electrode portion includes a first side portion including an outer edge coinciding with the first imaginary plane when viewed in the direction orthogonal to the main surface, and a second side portion including an outer edge coinciding with the second imaginary plane when viewed in the direction orthogonal to the main surface, the external electrode further includes a fourth electrode portion being continuous with the first electrode portion and the first side portion and the second side portion of the second electrode portion, exposed at the main surface, and separated from the third side surface when viewed in the direction orthogonal to the main surface, and a fifth electrode portion being continuous with the first electrode portion and separated from the fourth electrode portion in the direction orthogonal to the main surface, and the element body may include a part between the fourth electrode portion and the fifth electrode portion.

7. The multilayer inductor according to claim 1, wherein the second electrode portion and the third electrode portion are opposed to each other in the direction orthogonal to the main surface, with the part of the element body therebetween.

* * * * *